(12) United States Patent
Kanemoto et al.

(10) Patent No.: US 10,823,570 B2
(45) Date of Patent: Nov. 3, 2020

(54) PHYSICAL QUANTITY SENSOR, PHYSICAL QUANTITY SENSOR DEVICE, ELECTRONIC APPARATUS, AND VEHICLE

(71) Applicant: Seiko Epson Corporation, Tokyo (JP)

(72) Inventors: Kei Kanemoto, Fujimi (JP); Makoto Furuhata, Matsumoto (JP)

(73) Assignee: Seiko Epson Corporation (JP)

( * ) Notice: Subject to any disclaimer, the term of this patent is extended or adjusted under 35 U.S.C. 154(b) by 123 days.

(21) Appl. No.: 15/927,554

(22) Filed: Mar. 21, 2018

(65) Prior Publication Data
US 2018/0283868 A1    Oct. 4, 2018

(30) Foreign Application Priority Data
Mar. 28, 2017    (JP) .................................. 2017-063723

(51) Int. Cl.
| | |
|---|---|
| G01C 19/5747 | (2012.01) |
| G01P 15/125 | (2006.01) |
| G01C 19/5769 | (2012.01) |
| G01P 15/08 | (2006.01) |

(52) U.S. Cl.
CPC ........ G01C 19/5747 (2013.01); G01P 15/125 (2013.01); *G01C 19/5769* (2013.01); *G01P 2015/0814* (2013.01)

(58) Field of Classification Search
CPC ............ G01C 19/5747; G01C 19/5769; G01P 15/125
USPC .............. 73/504.12–504.16, 514.29, 514.04, 73/861.355–861.357
See application file for complete search history.

(56) References Cited

U.S. PATENT DOCUMENTS

| 7,088,559 B2 | 8/2006 | Hipwell, Jr. et al. |
|---|---|---|
| 9,067,777 B2 | 6/2015 | Furuhata et al. |
| 9,165,874 B2 | 10/2015 | Furuhata |
| 9,243,908 B2 | 1/2016 | Kanemoto |
| 9,321,627 B2 | 4/2016 | Furuhata |
| 2003/0030942 A1 | 2/2003 | Hipwell et al. |
| 2013/0255378 A1 | 10/2013 | Kanemoto |
| 2013/0270707 A1 | 10/2013 | Furuhata |
| 2014/0021562 A1 | 1/2014 | Furuhata et al. |
| 2015/0266720 A1 | 9/2015 | Furuhata |
| 2015/0268266 A1 | 9/2015 | Furuhata |
| 2016/0187299 A1* | 6/2016 | Wang ................. G01N 29/2406 73/643 |

FOREIGN PATENT DOCUMENTS

| JP | 11-201984 A | 7/1999 |
|---|---|---|
| JP | 2001-119040 A | 4/2001 |
| JP | 2005-500638 A | 1/2005 |

(Continued)

*Primary Examiner* — Robert R Raevis
(74) *Attorney, Agent, or Firm* — Harness, Dickey & Pierce, P.L.C.

(57) ABSTRACT

A physical quantity sensor includes: a base substrate; a first wiring portion that is fixed to the base substrate; a second wiring portion that is fixed to the base substrate and has at least a part disposed in parallel to the first wiring portion; and an electrode portion that is disposed in the base substrate and has a reference potential. The electrode portion is disposed between the base substrate, and the first and second wiring portions. At least parts of the first and second wiring portions overlap the electrode portion in a plan view.

6 Claims, 13 Drawing Sheets

(56) References Cited

FOREIGN PATENT DOCUMENTS

| | | | |
|---|---|---|---|
| JP | 2006-222253 | A | 8/2006 |
| JP | 2007-158169 | A | 6/2007 |
| JP | 2013-181957 | A | 9/2013 |
| JP | 2013-213728 | A | 10/2013 |
| JP | 2013-217650 | A | 10/2013 |
| JP | 2013-219265 | A | 10/2013 |
| JP | 2014-021037 | A | 2/2014 |
| JP | 2015-175809 | A | 10/2015 |
| JP | 2015-177153 | A | 10/2015 |
| JP | 2016-206207 | A | 12/2016 |

* cited by examiner

PHYSICAL QUANTITY SENSOR, PHYSICAL QUANTITY SENSOR DEVICE, ELECTRONIC APPARATUS, AND VEHICLE

BACKGROUND

1. Technical Field

The present invention relates to a physical quantity sensor, a physical quantity sensor device, an electronic apparatus, and a vehicle.

2. Related Art

In the related art, a configuration disclosed in JP-A-2014-21037 is known as a gyro sensor (angular velocity sensor). The gyro sensor disclosed in JP-A-2014-21037 includes a base substrate formed as a glass substrate and an element unit fixed to the base substrate. The element unit includes a frame-shaped vibration portion that can vibrate in the X axis direction, a movable driving electrode installed outside the vibration portion, a fixed driving electrode that is fixed to the base substrate and vibrates the vibration portion in the X axis direction by generating an electrostatic attractive force with the movable driving electrode, a movable portion that is disposed inside the vibration portion and can be displaced in the Y axis direction with respect to the vibration portion, a movable detection electrode that is installed in the movable portion, and a fixed detection electrode that is fixed to the base substrate and forms electrostatic capacitance with the movable detection electrode. When angular velocity around the Z axis is applied in a state in which the vibration portion is vibrated in the X axis direction in the gyro sensor, a displacement portion displaced in the Y axis direction by a Coriolis force and the electrostatic capacitance between the movable detection electrode and the fixed detection electrode changes. For this reason, the angular velocity around the Z axis can be detected based on the change in the electrostatic capacitance.

The gyro sensor disclosed in JP-A-2014-21037 includes a wiring electrically connected to a vibrator (the movable driving electrode and the movable detection electrode), a wiring electrically connected to the fixed driving electrode, and a wiring electrically connected to the fixed detection electrode. A silicon substrate in which some of the wirings are connected to the base substrate is formed.

In such a configuration, however, a dielectric constant of the base substrate (for example, a glass substrate) is relatively high (higher than that of air). Therefore, in a region in which these wirings are installed in parallel, there is a concern that electrostatic capacitance coupling occurs between the wirings via a base substrate. When the electrostatic capacitance coupling occurs, for example, a detection signal obtained from the fixed detection electrode may change, and thus there was a problem that detection precision of an angular velocity deteriorates.

SUMMARY

An advantage of some aspects of the invention is to provide a physical quantity sensor, a physical quantity sensor device, an electronic apparatus, and a vehicle capable of reducing electrostatic capacitance coupling between wirings.

The advantage can be achieved by the following configurations.

A physical quantity sensor according to an aspect of the invention includes: a base substrate; a first wiring portion that is fixed to the base substrate; a second wiring portion that is fixed to the base substrate and has at least a part disposed in parallel to the first wiring portion; and an electrode portion that is disposed in the base substrate and has a reference potential. The electrode portion is disposed between the base substrate, and the first and second wiring portions. At least parts of the first and second wiring portions overlap the electrode portion in a plan view.

With this configuration, since an electric force line oriented from the first wiring portion to the second wiring portion terminates at the electrode portion, it is possible to reduce an electrostatic capacitance coupling between the first and second wiring portions via the base substrate.

It is preferable that the physical quantity sensor according to the aspect of the invention further includes a driving portion that is displaceable with respect to the base substrate; a fixed driving electrode that is fixed to the base substrate and displaces the driving portion with respect to the base substrate; and a fixed monitor electrode that is fixed to the base substrate and detects the displacement of the driving portion, and the first wiring portion is electrically connected to the fixed driving electrode, and the second wiring portion is electrically connected to the fixed monitor electrode.

With this configuration, noise caused due to electrostatic capacitance coupling with the first wiring portion rarely occurs in the second wiring portion, and thus an unwilling change in an output signal from the second wiring portion is reduced. Thus, it is possible to detect a vibration state of the driving portions based on the output signal from the second wiring portion with higher precision than in a structure of the related art.

It is preferable that the physical quantity sensor according to the aspect of the invention includes a driving portion that is displaceable with respect to the base substrate; a movable portion that is displaceable with respect to the driving portion; a fixed driving electrode that is fixed to the base substrate and displaces the driving portion with respect to the base substrate; and a fixed detection electrode that is fixed to the base substrate and detects the displacement of the movable portion, and the first wiring portion is electrically connected to the fixed driving electrode, and the second wiring portion is electrically connected to the fixed detection electrode.

With this configuration, noise caused due to electrostatic capacitance coupling with the first wiring portion rarely occurs in the second wiring portion, and thus an unwilling change in an output from the second wiring portion is suppressed. Thus, it is possible to detect a vibration state of the movable portion based on the output from the second wiring portion with high precision.

It is preferable that the physical quantity sensor according to the aspect of the invention includes a third wiring portion that is fixed to the base substrate and is electrically connected to the driving portion, and the third wiring portion has a constant potential and is located between the first and second wiring portions.

With this configuration, the third wiring portion functions as a shield layer and an electric force line from the first wiring portion terminates at the third wiring portion. Thus, it is possible to efficiently reduce the electrostatic capacitance coupling between the first wiring portion located on one side of the third wiring portion and the second wiring portion located on the other side of the third wiring portion.

It is preferable that the physical quantity sensor according to the aspect of the invention includes: a driving portion that is displaceable with respect to the base substrate; a movable portion that is displaceable with respect to the driving portion; a fixed driving electrode that is fixed to the base substrate and displaces the driving portion with respect to the base substrate; a fixed monitor electrode that is fixed to the base substrate and detects the displacement of the movable portion; a fixed detection electrode that is fixed to the base substrate and detects the displacement of the movable portion; and a third wiring portion that is fixed to the base substrate and is electrically connected to the driving portion, and the third wiring portion has a constant potential and is located between the first and second wiring portions, the first wiring portion is electrically connected to the fixed driving electrode, the second wiring portion includes a monitor wiring portion electrically connected to the fixed monitor electrode and a detection wiring portion electrically connected to the fixed detection electrode, and the monitor wiring portion is located between the third wiring portion and the detection wiring portion.

With this configuration, the first wiring portion and the detection wiring portion can be further separated from each other, and thus it is possible to efficiently reduce the electrostatic capacitance coupling between the first wiring portion and the detection wiring portion via the base substrate. Therefore, it is possible to detect the displacement of the movable portion based on the output from the detection wiring portion with high precision.

In the physical quantity sensor according to the aspect of the invention, it is preferable that the electrode portion is electrically connected to the third wiring portion.

With this configuration, the electrode portion can be set to have the reference potential with a relatively simple configuration.

In the physical quantity sensor according to the aspect of the invention, it is preferable that, in the base substrate, a depression is formed to overlap the first and second wiring portions in a plan view, and the electrode portion is installed in the depression.

With this configuration, it is possible to dispose the electrode portion while preventing contact with the first and second wiring portions with a relatively simple configuration.

In the physical quantity sensor according to the aspect of the invention, it is preferable that a separation distance between the depression and the first wiring portion is less than a separation distance between the depression and the second wiring portion.

With this configuration, it is possible to terminate the electric force line from the first wiring portion at the electrode portion more efficiently. In addition, it is possible to reduce the electrostatic capacitance coupling between the second wiring portion and the electrode portion. Therefore, an unwilling change in an output from the second wiring portion is further reduced.

In the physical quantity sensor according to the aspect of the invention, it is preferable that each of the first and second wiring portions includes a fixed portion fixed to the base substrate in a portion which does not overlap the depression in a plan view, and the fixed portion of the first wiring portion and the fixed portion of the second wiring portion are shifted in an extension direction of the first and second wiring portions.

With this configuration, it is possible to lengthen the separation distance between the fixed portion of the first wiring portion and the fixed portion of the second wiring portion. Therefore, it is possible to efficiently reduce the electrostatic capacitance coupling between the first and second wiring portions via the base substrate.

It is preferable that the physical quantity sensor according to the aspect of the invention further includes a cover that has a constant potential, and the first and second wiring portions are located between the cover and the base substrate. and a separation distance between the cover and the first wiring portion is less than a separation distance between the cover and the second wiring portion.

With this configuration, it is possible to terminate the electric force line from the first wiring portion at the cover more efficiently. In addition, it is possible to reduce the electrostatic capacitance coupling between the second wiring portion and the cover. Therefore, an unwilling change in an output from the second wiring portion is further reduced.

A physical quantity sensor device according to another aspect of the invention includes the physical quantity sensor according to the aspect of the invention.

With this configuration, it is possible to obtain the advantages of the physical quantity sensor according to the aspect of the invention, and thus it is possible to obtain the physical quantity sensor device with high reliability.

The physical quantity sensor device according to the aspect of the invention may further include a substrate on which the physical quantity sensor is mounted, and the circuit element may be mounted on a surface opposite to a side of the substrate of the physical quantity sensor.

In the physical quantity sensor device according to the aspect of the invention, the physical quantity sensor and the circuit element may be molded.

In the physical quantity sensor device according to the aspect of the invention, the physical quantity sensor and the circuit element may be accommodated in a ceramic package.

An electronic apparatus according to another aspect of the invention includes the physical quantity sensor according to the aspect of the invention.

With this configuration, it is possible to obtain the advantages of the physical quantity sensor according to the aspect of the invention, and thus it is possible to obtain the electronic apparatus with high reliability.

The electronic apparatus according to the aspect of the invention may be a wearable apparatus.

A vehicle according to another aspect of the invention includes the physical quantity sensor according to the aspect of the invention; and an attitude control device that controls an attitude based on a detection signal from the physical quantity sensor.

With this configuration, it is possible to obtain the advantages of the physical quantity sensor according to the aspect of the invention, and thus it is possible to obtain the vehicle with high reliability. The vehicle according to the aspect of the invention may be one of an automobile, an aircraft, a rocket, an artificial satellite, a ship, an unmanned carrier, a bipedal walking robot, and an unmanned aircraft.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a physical quantity sensor, a physical quantity sensor device, an electronic apparatus, and a vehicle according to the invention will be described in detail according to embodiments illustrated in the appended drawings.

First Embodiment

First, a physical quantity sensor according to a first embodiment of the invention will be described.

Figure 1:
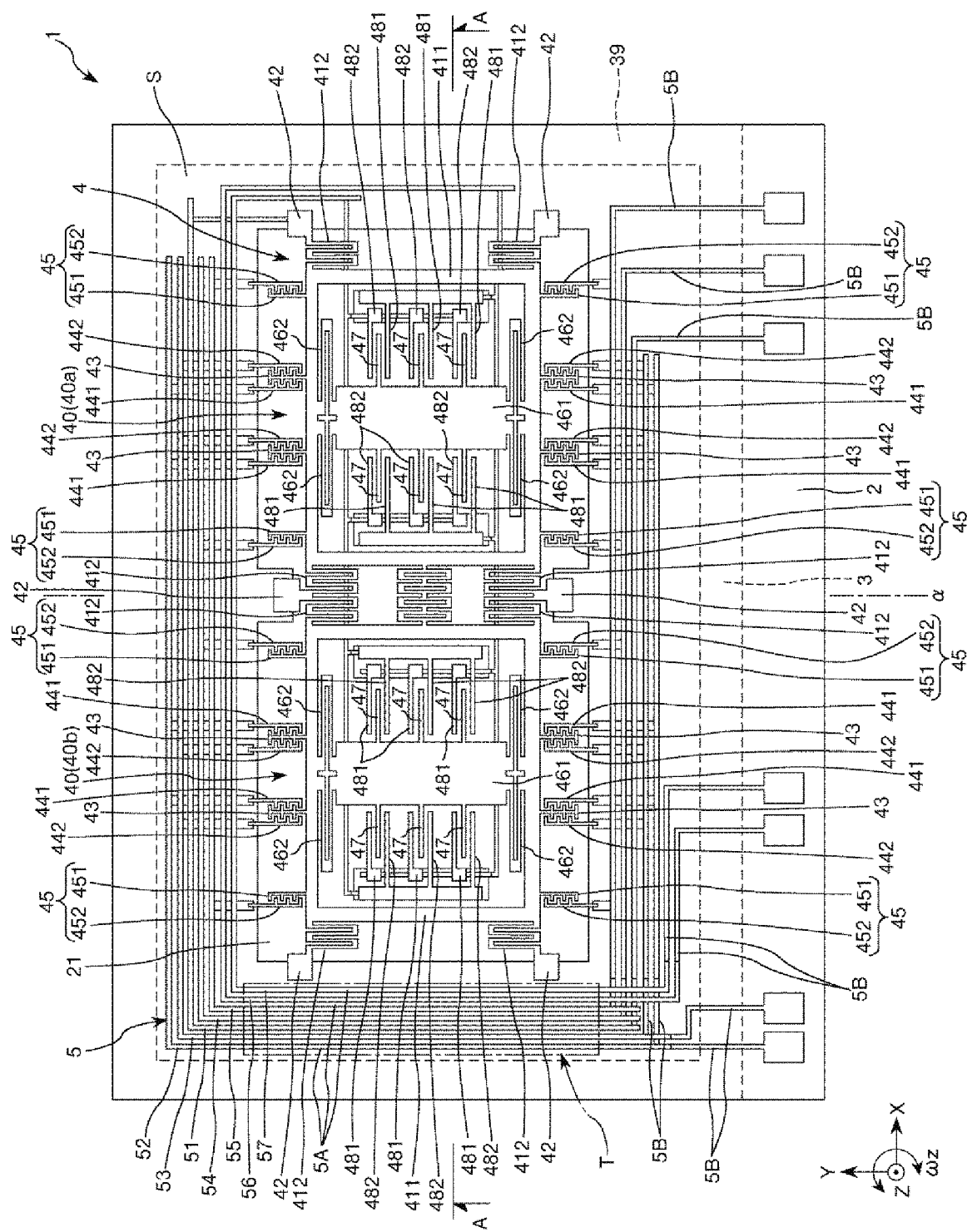
FIG. 1 is a plan view illustrating a physical quantity sensor according to a first embodiment of the invention.
Figure 2:
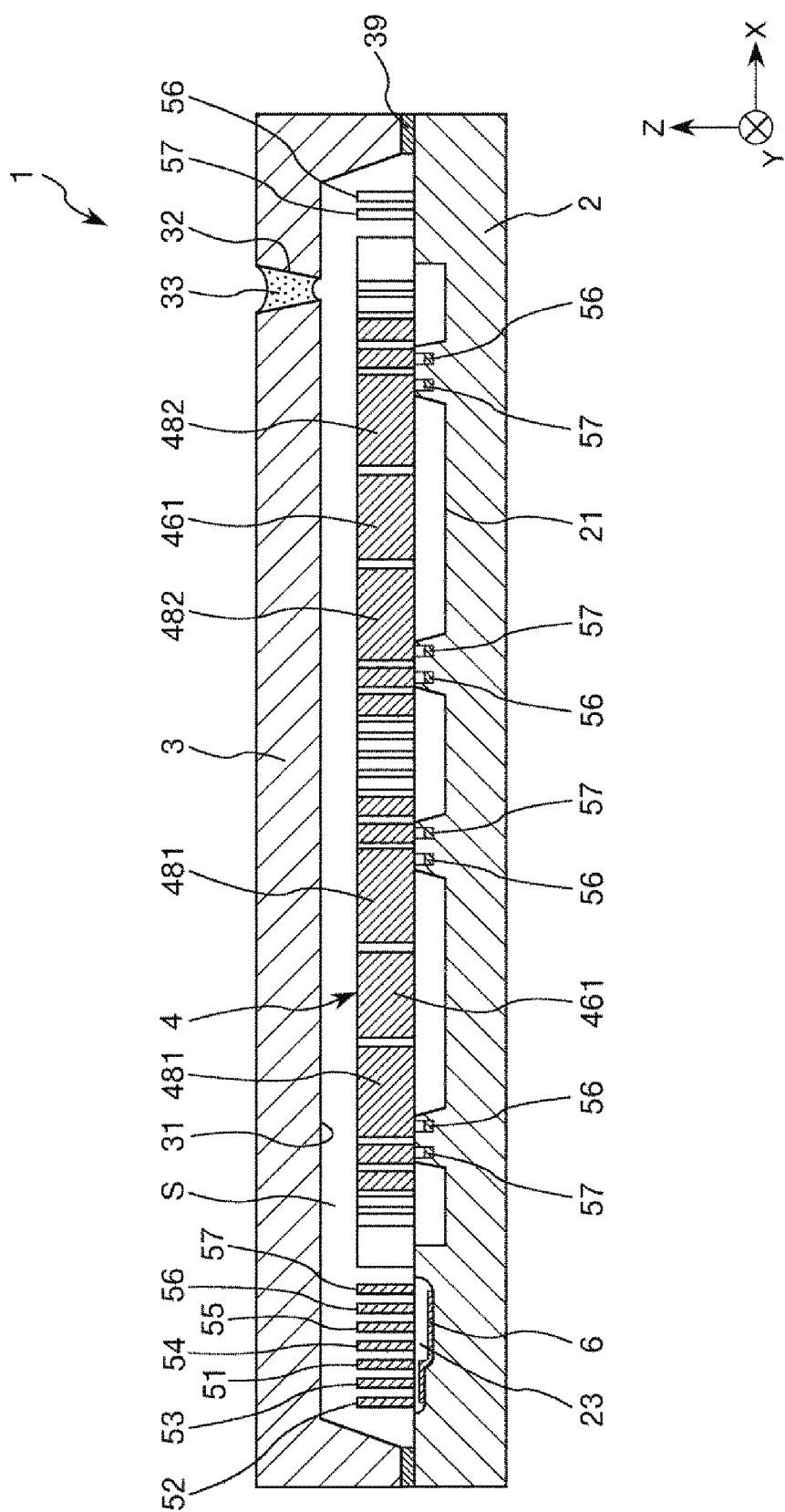
FIG. 2 is a sectional view taken along the line A-A of FIG. 1.
Figure 3:
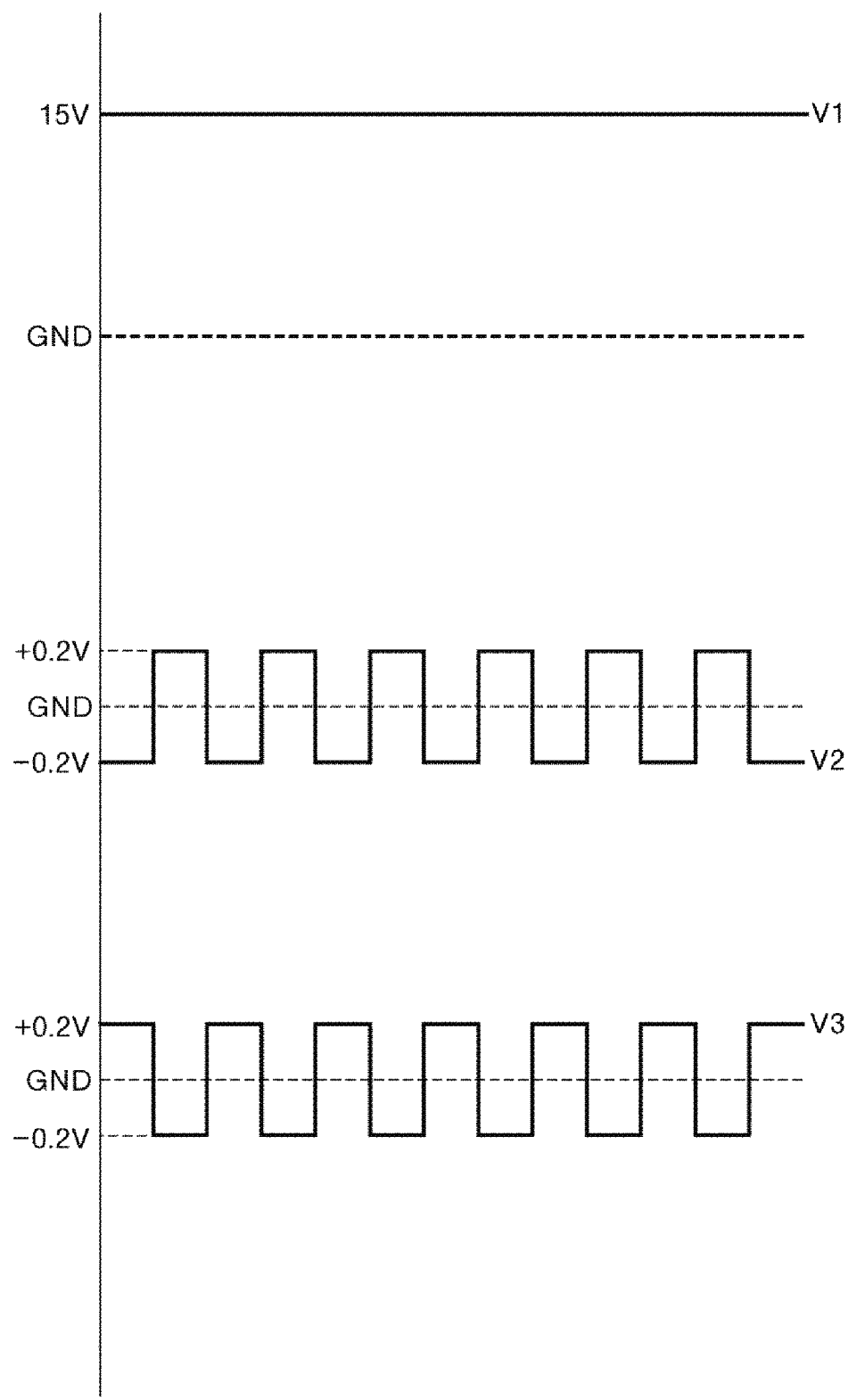
FIG. 3 is a diagram illustrating voltage waveforms applied to an element unit.
Figure 4:
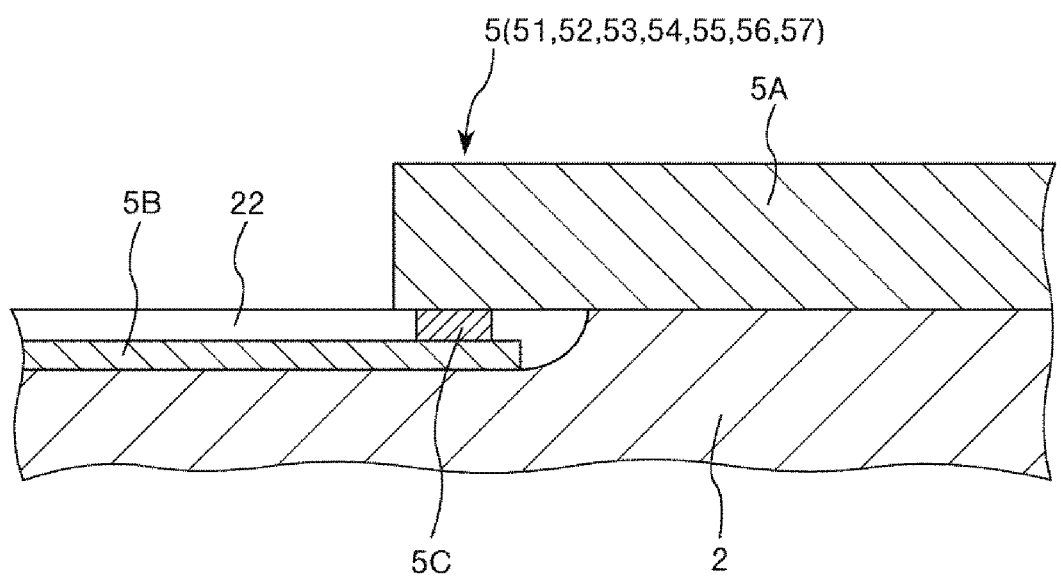
FIG. 4 is a sectional view illustrating wiring portions included in the physical quantity sensor illustrated in FIG. 1.
Figure 5:
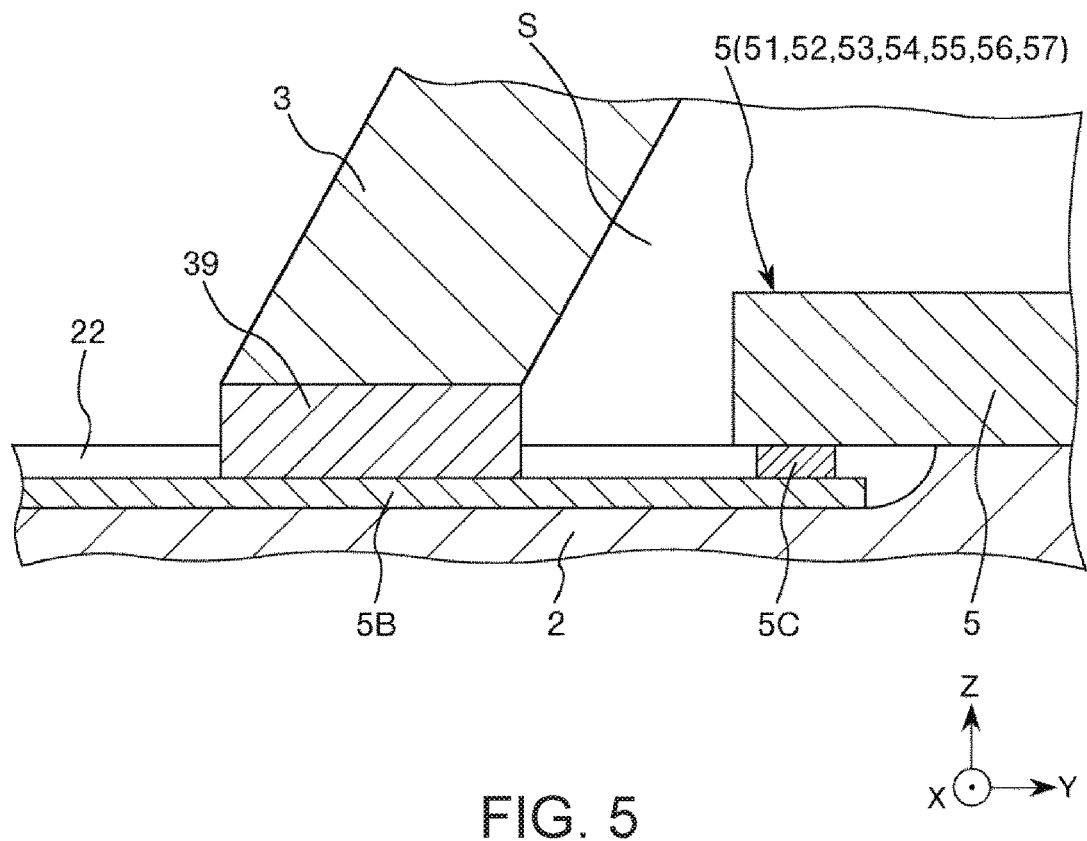
FIG. 5 is a sectional view illustrating the wiring portions included in the physical quantity sensor illustrated in FIG. 1.
Figure 6:
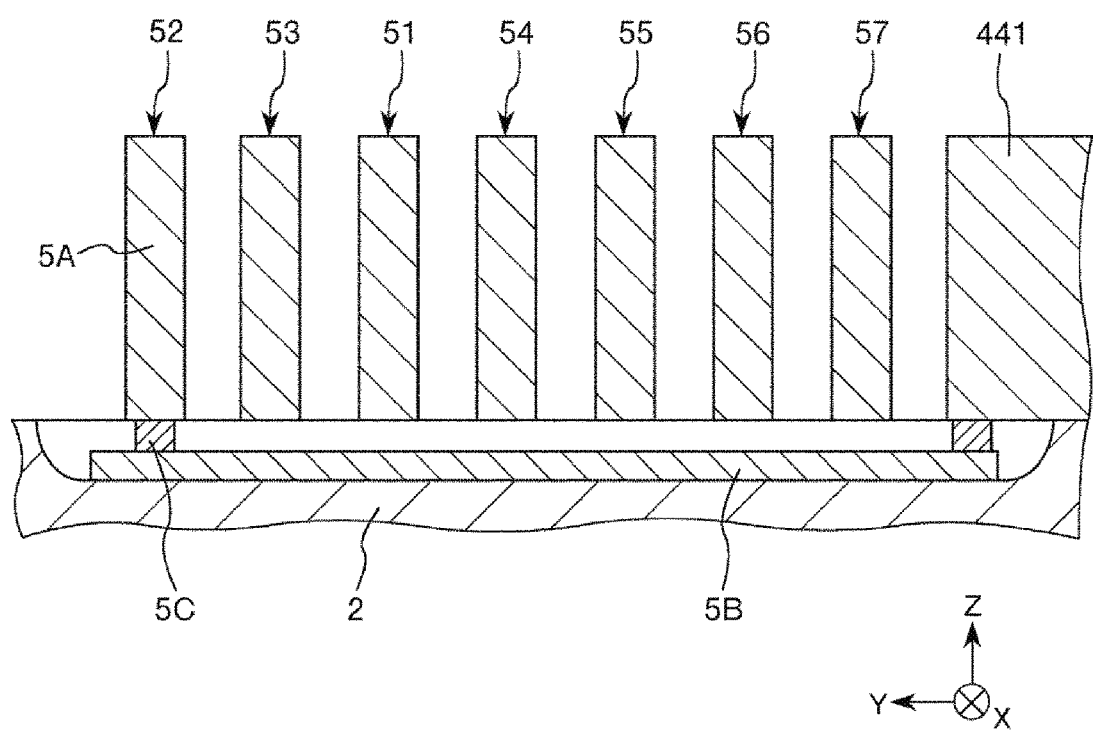
FIG. 6 is a sectional view illustrating the wiring portions included in the physical quantity sensor illustrated in FIG. 1.
Figure 7:
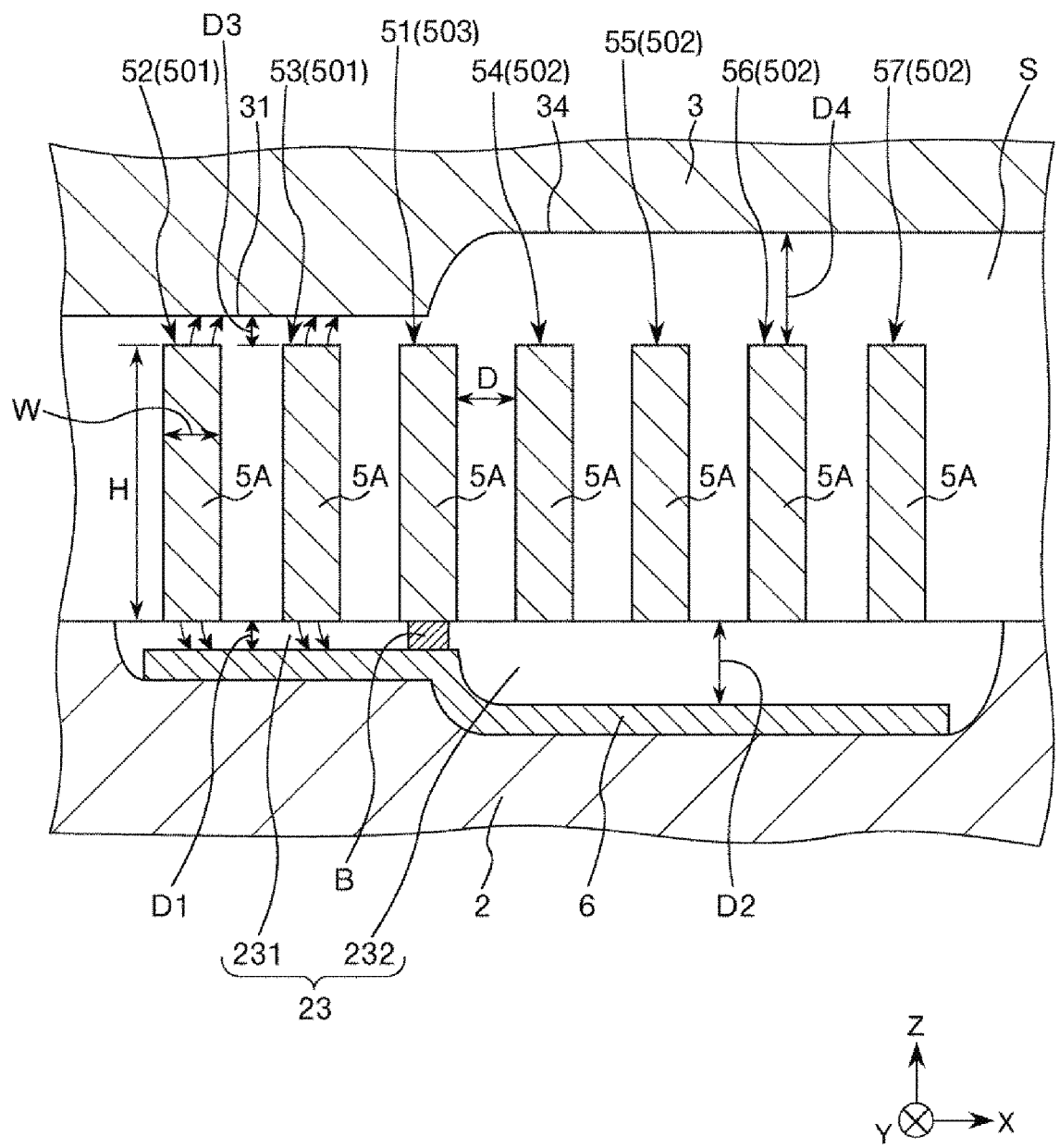
FIG. 7 is a sectional view illustrating the wiring portions included in the physical quantity sensor illustrated in FIG. 1.
Figure 8:
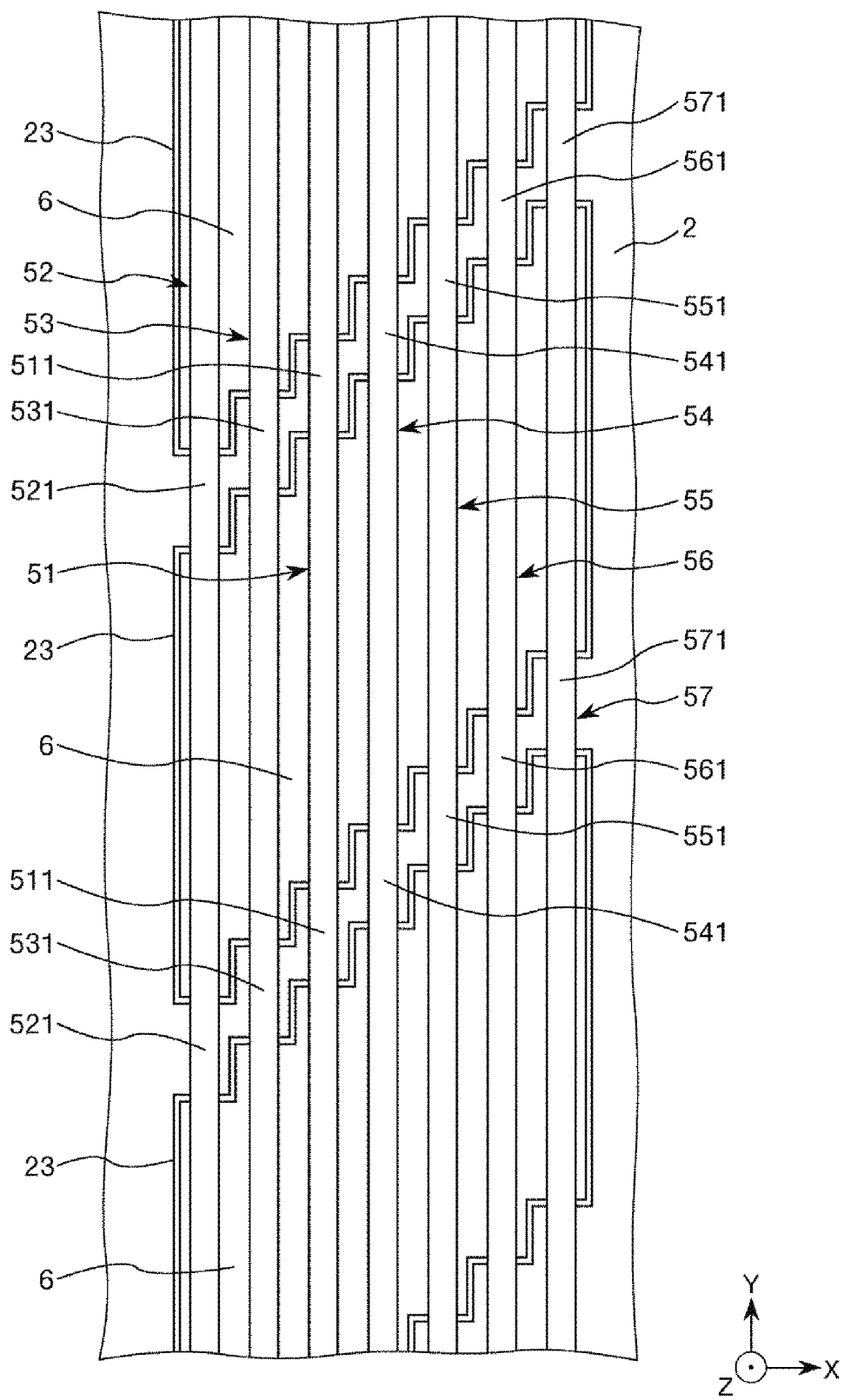
FIG. 8 is a plan view illustrating the wiring portions included in the physical quantity sensor illustrated in FIG. 1.
Figure 9:
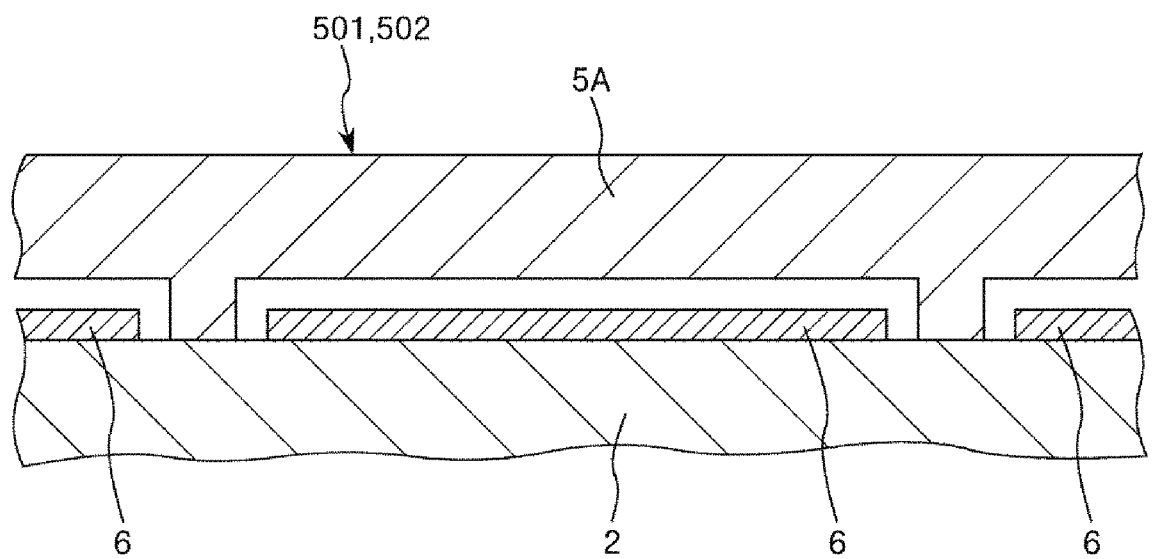
FIG. 9 is a sectional view illustrating a modification example of the physical quantity sensor illustrated in FIG. 1.
Figure 9:
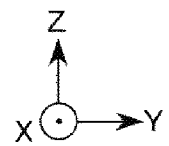

FIG. 1 is a plan view illustrating a physical quantity sensor according to a first embodiment of the invention. FIG. 2 is a sectional view taken along the line A-A of FIG. 1. FIG. 3 is a diagram illustrating voltage waveforms applied to an element unit. FIG. 4 is a sectional view illustrating wiring portions included in the physical quantity sensor illustrated in FIG. 1. FIG. 5 is a sectional view illustrating the wiring portions included in the physical quantity sensor illustrated in FIG. 1. FIG. 6 is a sectional view illustrating the wiring portions included in the physical quantity sensor illustrated in FIG. 1. FIG. 7 is a sectional view illustrating the wiring portions included in the physical quantity sensor illustrated in FIG. 1. FIG. 8 is a plan view illustrating the wiring portions included in the physical quantity sensor illustrated in FIG. 1. FIG. 9 is a sectional view illustrating a modification example of the physical quantity sensor illustrated in FIG. 1.

Hereinafter, to facilitate description, the front side of the sheet surface in FIG. 1 and the left side in FIG. 2 are referred to a "top" and the rear side of the sheet surface in FIG. 1 and the right side in FIG. 2 are referred to as a "bottom". In the drawings, three axes perpendicular to each other are referred to as the X, Y, and Z axes. Hereinafter, a direction parallel to the X axis is also referred to as an "X axis direction", a direction parallel to the Y axis is also referred to as a "Y axis direction", and a direction parallel to the Z axis is also referred to as a "Z axis direction. The front end side of the arrow on each axis is referred to as a "positive side" and an opposite side is also referred to as a "negative side".

A physical quantity sensor 1 illustrated in FIG. 1 is a gyro sensor (angular velocity sensor) capable of detecting an angular velocity ωz around the Z axis. The physical quantity sensor 1 includes a base substrate 2, a cover 3, an element unit 4, and a wiring unit 5.

As illustrated in FIG. 1, the base substrate 2 is formed in a rectangular plate form in a plan view. The base substrate 2 includes a depression 21 opened on the upper surface side. In a plan view in the Z axis direction, the element unit 4 overlaps the depression 21 and the base substrate 2 is formed to be larger than the element unit 4 so that the element unit 4 is disposed more inside than a bonding region to the cover 3. The depression 21 functions as a clearance portion for preventing (suppressing) contact of the element unit 4 to the base substrate 2. The element unit 4 is bonded to the upper surface of the base substrate 2. The base substrate 2 has a constant potential such as a ground (GND). The constant potential means a case in which a potential includes, for example, an unavoidable fluctuation of a voltage (for example, a fluctuation of about ±5%) in addition to a case in which the voltage is constant.

As the base substrate 2, for example, a glass substrate formed of a glass material (for example, borosilicate glass such as Tempax glass (registered trademark) or Pyrex glass (registered trademark)) that contains alkali metal ions (mobile ions) such as sodium ions can be used. Thus, for example, as will be described below, the element unit 4 formed of a silicon substrate can be bonded to the base substrate 2 by an anodic bonding method. Therefore, the element unit 4 can be rigidly bonded to the base substrate 2. The base substrate 2 with optical transparency can also be obtained. Therefore, the inside of the physical quantity sensor 1 can be viewed through the base substrate 2 from the outside of the physical quantity sensor 1.

Here, the base substrate 2 is not particularly limited to a glass substrate. For example, an insulating substrate such as a silicon substrate or a ceramics substrate may be used. When a silicon substrate is used as the base substrate 2, it is preferable to use a silicon substrate with high resistance or to use a silicon substrate in which a silicon oxide film (insulating oxide) is formed on the surface by thermal oxidation from the viewpoint of preventing short-circuiting.

As illustrated in FIG. 1, the cover 3 is formed in a rectangular plate shape in a plan view. As illustrated in FIG. 2, the cover 3 includes a depression 31 opened on the lower surface side (the side of the base substrate 2). The cover 3 is bonded to the upper surface of the base substrate 2 so that the element unit 4 is disposed more inside than the depression 31 in the plan view. An accommodation space S for accommodating the element unit 4 is formed inside by the cover 3 and the base substrate 2. The cover 3 has a constant potential such as a ground (GND). The constant potential means a case in which a potential includes, for example, an unavoidable fluctuation of a voltage (for example, a fluctuation of about ±5%) in addition to a case in which the voltage is constant (the same applies below).

As illustrated in FIG. 2, the cover 3 includes a communication hole 32 communicating with the inside and the outside of the accommodation space S. The accommodation space S can be replaced with a desired atmosphere via the communication hole 32. A sealing member 33 is disposed in the communication hole 32 and the communication hole 32 is sealed by the sealing member 33. The accommodation space S is preferably in a depressurization state (preferably, a vacuum state). Thus, viscous resistance is reduced, and thus the element unit 4 can be efficiently vibrated (driven).

The sealing member 33 is not particularly limited as long as the communication hole 32 can be sealed. For example, any of various alloys such as a gold (Au)/tin (Sn)-based alloy, a gold (Au)/germanium (Ge)-based alloy, and gold (Au)/aluminum (Al)-based alloy or a glass material such as low-melting point glass can be used.

In the embodiment, the cover 3 is configured as, for example, a silicon substrate. Here, the cover 3 is not particularly limited. For example, a glass substrate or a ceramics substrate may be used. A method of bonding the base substrate 2 to the cover 3 is not particularly limited and may be appropriately selected depending on the materials of the base substrate 2 to the cover 3. For example, anodic bonding, activation bonding in which bonding surfaces activated by plasma irradiation are bonded, bonding in which a bonding material such as a glass frit is used, and diffusion bonding in which metal films formed on the upper surface of the base substrate 2 and the lower surface of the cover 3 are bonded can be exemplified. In the embodiment, as illustrated in FIG. 2, base substrate 2 and the cover 3 are bonded via a glass frit 39 (low melting point glass) which is an example of the bonding material.

As illustrated in FIG. 1, the element unit 4 is disposed in the accommodation space S and is bonded to the upper surface of the base substrate 2. The element unit 4 includes two structures 40 (40a and 40b). The element unit 4 is bonded to the upper surface of the base substrate 2 and can be integrally formed by patterning, for example, a conductive silicon substrate to which impurities such as phosphorous or boron are doped by a dry etching method (particularly, a Bosch method). The method of bonding the silicon substrate to the base substrate 2 is not particularly limited. For example, an anodic bonding method can be used.

The two structures 40a and 40b are arranged in the X axis direction and are symmetric about an imaginary line a formed along the Y axis. Each structure 40 includes a driving portion 411, driving spring portions 412, fixed portions 42, movable driving electrodes 43, fixed driving electrodes 441 and 442, driving monitor electrodes 45, a movable portion 461, detection spring portions 462, movable detection electrodes 47, and fixed detection electrodes 481 and 482.

The driving portion 411 is a rectangular frame. The driving portion 411 is connected to the fixed portions 42 via the driving spring portions 412 at its four corners. Each fixed portion 42 is bonded to the upper surface of the base substrate 2, and thus the driving portion 411 and the driving spring portion 412 are supported in a floating state from the base substrate 2. Each driving spring portion 412 has elasticity in the X axis direction. Therefore, the driving portion 411 can be displaced in the X axis direction with respect to the fixed portions 42 while elastically deforming the driving spring portions 412 in the X axis direction.

At least one of the plurality of fixed portions 42 is electrically connected to a body wiring portion 51 to be described below.

The movable driving electrodes 43 are installed in the driving portions 411. In the embodiment, two movable driving electrodes 43 are installed on the positive side of the Y axis direction and two movable driving electrodes 43 are installed on the negative side of the Y axis direction in the driving portions 411, and thus a total of four movable driving electrodes 43 are installed. Each of the movable driving electrodes 43 has a comb-tooth shape including a support portion extending in the Y axis direction from the driving portion 411 and a plurality of electrode fingers extending from the support portion on both sides of the X axis direction. The shape, the disposition, the number, and the like of the movable driving electrodes 43 are not particularly limited.

The fixed driving electrodes 441 and 442 are bonded (fixed) to the base substrate 2. One movable driving electrode 43 is located between a pair of fixed driving electrodes 441 and 442. Each of the fixed driving electrodes 441 and 442 has a comb-tooth shape including a support portion extending in the Y axis direction and a plurality of electrode fingers extending from the support portion to one side of the X axis direction (the side of the movable driving electrode 43). The shape, the disposition, the number, and the like of the fixed driving electrodes 441 and 442 are not particularly limited.

Each fixed driving electrode 441 is electrically connected to a first driving wiring portion 52 to be described below and each fixed driving electrode 442 is electrically connected to a second driving wiring portion 53 to be described below.

In this configuration, for example, a voltage V1 illustrated in FIG. 3 is applied to the movable driving electrode 43 via the body wiring portion 51, a voltage V2 illustrated in FIG. 3 is applied to the fixed driving electrode 441 via the first driving wiring portion 52, and a voltage V3 illustrated in FIG. 3 is applied to the fixed driving electrode 442 via the second driving wiring portion 53. The voltage V1 is higher than a GND reference (for example, a constant potential of about 0.9 V) and the voltages V2 and V3 have a rectangular wave centering on the GND reference. Here, the voltages V1, V2, and V3 are not particularly limited.

Thus, the driving portion 411 can be vibrated in the X axis direction while expanding and contracting the driving spring portion 412 (elastically deforming) in the X axis direction. Here, the structures 40a and 40b are symmetric in the disposition of the fixed driving electrodes 441 and 442. Therefore, two driving portions 411 vibrate at opposite phases in the X axis direction to approach and be separated from each other. Thus, it is possible to cancel the vibration of the two driving portions 411 and it is possible to reduce vibration leakage. Hereinafter, this vibration mode is also referred to as a "driving vibration mode".

As described above, in the embodiment, a scheme of vibrating the driving portions 411 in the X axis direction by an electrostatic attractive force (an electrostatic driving scheme) is realized, but a method of vibrating the driving portions 411 in the X axis direction is not particularly limited. A piezoelectric driving scheme, an electromagnetic driving scheme using a Lorentz force of a magnetic field, or the like can be applied.

The driving monitor electrodes 45 are paired and include a movable monitor electrode 451 and a fixed monitor electrode 452 forming electrostatic capacitance between these electrodes. The movable monitor electrodes 451 are installed in the driving portions 411. In the embodiment, two movable monitor electrodes 451 are installed on the positive side of the X axis direction in the driving portion 411 and two movable monitor electrodes 451 are installed on the negative side of the X axis direction, and thus a total of four movable monitor electrodes 451 are installed. Each of the movable monitor electrodes 451 has a comb-tooth shape including a support portion extending in the Y axis direction from the driving portion 411 and a plurality of electrode fingers extending on one side of the X axis direction (the side of the fixed monitor electrode 452) from the support portion. On the other hand, the plurality of fixed monitor electrodes 452 are fixed to the base substrate 2 and are installed to face the movable monitor electrodes 451. Each of the fixed monitor electrodes 452 has a comb-tooth shape including a support portion extending in the Y axis direction and a plurality of electrode fingers extending on one side of the X axis direction (the side of the movable monitor electrode 451) from the support portion.

Each of two movable monitor electrodes 451 located on the positive side of the X axis direction among four movable monitor electrodes 451 included in the structure 40a and two movable monitor electrodes 451 located on the negative side of the X axis direction among four movable monitor electrodes 451 included in the structure 40b is electrically connected to a first monitor wiring portion 54 to be described below. Each of two movable monitor electrodes 451 located on the negative side of the X axis direction among four movable monitor electrodes 451 included in the structure 40a and two movable monitor electrodes 451 located on the positive side of the X axis direction among four movable monitor electrodes 451 included in the structure 40b is electrically connected to a second monitor wiring portion 55 to be described below. Each of the fixed monitor electrodes 452 is connected to the above-described GND reference via the wiring portions 54 and 55, and the voltage V1 is applied to the movable monitor electrode 451 via the body wiring portion 51. Thus, electrostatic capacitance is formed between the movable monitor electrode 451 and the fixed monitor electrode 452.

As described above, when the structure 40 is vibrated in the driving vibration mode, a gap between the movable monitor electrode 451 and the fixed monitor electrode 452 is changed due to the displacement of the driving portion 411 in the X axis direction. Accordingly, the electrostatic capacitance between the movable monitor electrode 451 and the fixed monitor electrode 452 is changed. Thus, the vibration state of the driving portion 411 can be monitored based on the change in the electrostatic capacitance.

The movable portion 461 is located inside the frame-shaped driving portion 411. The movable portion 461 is connected to the driving portion 411 via the detection spring portions 462 at both ends of the movable portion 461 in the Y axis direction. Each detection spring portion 462 has elasticity in the Y axis direction. Therefore, the movable portion 461 can be displaced in the Y axis direction with respect to the driving portion 411 while expanding and contracting (elastically deforming) the detection spring portions 462 in the Y axis direction. Here, the shape, the disposition, the number, and the like of the detection spring portions 462 are not particularly limited.

The plurality of movable detection electrodes 47 extend on both sides of the X axis direction from the movable portion 461 to be arranged in the Y axis direction. Each of the fixed detection electrodes 481 and 482 are fixed to the base substrate 2. The fixed detection electrodes 481 are disposed to face each movable detection electrode 47 on the negative side of the Y axis direction in the structure 40a and are disposed to face each movable detection electrode 47 on the positive side of the Y axis direction in the structure 40b. On the other hand, the fixed detection electrodes 482 are disposed to face each movable detection electrode 47 on the positive side of the Y axis direction in the structure 40a and are disposed to face each movable detection electrode 47 on the negative side of the Y axis direction in the structure 40b.

Each fixed detection electrode 481 is electrically connected to a first detection wiring portion 56 to be described below and each fixed detection electrode 482 is electrically connected to a second detection wiring portion 57 to be described below. Therefore, electrostatic capacitance is formed between the movable detection electrode 47 and the fixed detection electrode 481 and between the movable detection electrode 47 and the fixed detection electrode 482.

When the angular velocity $\omega z$ is applied at the time of vibrating two driving portions 411 in the above-described driving vibration mode, a Coriolis force acts so that the movable portion 461 vibrates in the Y axis direction with respect to the driving portion 411 while the movable portion 461 elastically deforms the detection spring portions 462 (hereafter this vibration mode is also referred to as a "detection vibration mode"). Thus, the gap between the movable detection electrode 47 and the fixed detection electrode 481 changes, and thus the electrostatic capacitance between the movable detection electrode 47 and the fixed detection electrode 481 is changed. The gap between the movable detection electrode 47 and the fixed detection electrode 482 changes, and thus the electrostatic capacitance between the movable detection electrode 47 and the fixed detection electrode 482 is changed. Therefore, by detecting a change amount of the electrostatic capacitance, it is possible to obtain the angular velocity $\omega z$.

Next, the wiring unit 5 will be described. As illustrated in FIG. 2, the wiring unit 5 includes the body wiring portion 51, the first driving wiring portion 52, the second driving wiring portion 53, the first monitor wiring portion 54, the second monitor wiring portion 55, the first detection wiring portion 56, and the second detection wiring portion 57. The wiring portions 51, 52, 53, 54, 55, 56, and 57 are disposed in the periphery of the depression 21. For example, in at least a part such as a region T or the like indicated by a one-dot chain line in FIG. 1, the wiring portions 51, 52, 53, 54, 55, 56, and 57 are disposed in parallel and extend in the same direction.

Of the wiring portions, the first driving wiring portion 52 and the second driving wiring portion 53 are equivalent to a first wiring portion 501 according to the invention, the first monitor wiring portion 54, the second monitor wiring portion 55, the first detection wiring portion 56, and the second detection wiring portion 57 are equivalent to a second wiring portion 502 according to the invention, and the body wiring portion 51 is equivalent to a third wiring portion 503 according to the invention.

The wiring unit 5 (51, 52, 53, 54, 55, 56, and 57) includes a portion fixed to the upper surface of the base substrate 2 and a portion located inside a depression 22 opened on the upper surface side of the base substrate 2. As illustrated in FIG. 4, the wiring unit 5 (51, 52, 53, 54, 55, 56, and 57) includes a portion formed by a structure 5A bonded to the upper surface of the base substrate 2, a portion formed by a wiring 5B disposed in the depression 22 opened on the upper surface side of the base substrate 2, and a portion formed by a conductive bump 5C connecting these portions.

The structure 5A is bonded to the upper surface of the base substrate 2 and is formed, for example, by patterning a conductive silicon substrate to which impurities such as phosphorus or boron are doped by a dry etching method (particular, a Bosch method). That is, the structure 5A can be formed along with the above-described element unit 4. Therefore, it is easy to form the structure 5A. Since the thickness of the structure 5A can be set to be relatively thick, for example, a resistant value can be set to be lower than that of the wiring 5B. Thus, it is possible to achieve a reduction in power consumption.

A constituent material of the wiring 5B is not particularly limited. For example, a metal material such as gold (Au), silver (Ag), platinum (Pt), palladium (Pd), iridium (Ir), copper (Cu), aluminum (Al), nickel (Ni), a titanium (Ti), or tungsten (W), an alloy containing such a metal material, or an oxide-based transparent conductive material such as indium tin oxide (ITO), indium zinc oxide (IZO), ZnO, or IGZO can be exemplified. One or two or more thereof can be combined to be used (for example, as a stacked body of two or more layers).

The wiring 5B is used in a portion spanning a bonded portion of the base substrate 2 and the cover 3, as illustrated in FIG. 5, or a portion spanning other wiring portions, as illustrated in FIG. 6. Thus, it is easy to bond the base substrate 2 to the cover 3 by the glass frit 39, and it is possible to avoid short-circuiting between different wiring portions with a relatively simple configuration.

Next, the region T (the region in which the wiring portions 51, 52, 53, 54, 55, 56, and 57 are disposed in parallel and extend in the same direction) will be described in detail. As illustrated in FIG. 7, in the region T, all the wiring portions 51, 52, 53, 54, 55, 56, and 57 are formed as the structure 5A. In the region T, the first driving wiring portion 52, the second driving wiring portion 53, the body wiring portion 51, the first monitor wiring portion 54, the second monitor wiring portion 55, the first detection wiring portion 56, and the second detection wiring portion 57 are disposed in this order from the negative side to the positive side of the X axis direction. Here, the arrangement order of the wiring portions 51, 52, 53, 54, 55, 56, and 57 is not particularly limited.

The size of the structure 5A is not particularly limited and can be set to have, for example, a width W equal to or greater than 1 μm and equal to or less than 10 μm and a height H equal to or greater than 20 μm and equal to or less than 30 μm. A separation distance D between the mutually adjacent wiring portions is not particularly limited and can be set to be, for example, equal to or greater than 1 μm and equal to or less than 10 μm.

A depression 23 opened on the upper surface side of the base substrate 2 is formed in the base substrate 2. The depression 23 is disposed to overlap the wiring portions 51, 52, 53, 54, 55, 56, and 57 in a plan view when viewed in the Z axis direction. An electrode portion 6 is formed on the bottom surface of the depression 23. The electrode portion 6 has a reference potential with a constant voltage. The reference potential means a case in which a potential includes, for example, an unavoidable fluctuation of a voltage (for example, a fluctuation of about ±5%) in addition to a case in which the voltage is constant. In this way, by setting the electrode portion 6 as the reference potential, it is possible to have the following advantages.

By installing the electrode portion 6 in the depression 23, as illustrated in FIG. 7, electric force lines from the first driving wiring portion 52 and the second driving wiring portion 53 terminate at the electrode portion 6. Therefore, it is possible to suppress electrostatic capacitance coupling between at least one of the first driving wiring portion 52 and the second driving wiring portion 53 and at least one of the first monitor wiring portion 54, the second monitor wiring portion 55, the first detection wiring portion 56, and the second detection wiring portion 57 via the base substrate 2. Therefore, noise caused due to the electrostatic capacitance coupling rarely occurs in the first monitor wiring portion 54, the second monitor wiring portion 55, the first detection wiring portion 56, and the second detection wiring portion 57, and thus an unwilling change in an output from each of the wiring portions 54, 55, 56, and 57 is suppressed. Accordingly, it is possible to detect a vibration state of the driving portion 411 with high precision based on outputs from the first monitor wiring portion 54 and the second monitor wiring portion 55 and it is possible to detect the angular velocity ωz with high precision based on outputs from the first detection wiring portion 56 and the second detection wiring portion 57.

Here, since a purpose of the physical quantity sensor 1 is to detect the angular velocity ωz, outputs (detection outputs) from the first detection wiring portion 56 and the second detection wiring portion 57 detecting the angular velocity ωz are more important than outputs (monitor outputs) of the first monitor wiring portion 54 and the second monitor wiring portion 55 detecting a vibration state of the driving portion 411. Therefore, in the embodiment, the first detection wiring portion 56 and the second detection wiring portion 57 are disposed more away from the first driving wiring portion 52 and the second driving wiring portion 53 than the first monitor wiring portion 54 and the second monitor wiring portion 55. Specifically, the first monitor wiring portion 54 and the second monitor wiring portion 55 are disposed between the first driving wiring portion 52 and the second driving wiring portion 53, and the first detection wiring portion 56 and the second detection wiring portion 57. Thus, the first detection wiring portion 56 and the second detection wiring portion 57 can be further separated from the first driving wiring portion 52 and the second driving wiring portion 53, and thus the electrostatic capacitance coupling between the first driving wiring portion 52 and the second driving wiring portion 53, and the first detection wiring portion 56 and the second detection wiring portion 57 via the base substrate 2 can be suppressed more effectively. Therefore, it is possible to further improve detection precision of the angular velocity ωz.

Here, the disposition of the first monitor wiring portion 54, the second monitor wiring portion 55, the first detection wiring portion 56, and the second detection wiring portion 57 is not particularly limited. In contrast to the embodiment, the first detection wiring portion 56 and the second detection wiring portion 57 may be disposed between the first driving wiring portion 52 and the second driving wiring portion 53, and the first monitor wiring portion 54 and the second monitor wiring portion 55.

In the embodiment, the body wiring portion 51 is disposed between the first driving wiring portion 52 and the second driving wiring portion 53, and the first monitor wiring portion 54, the second monitor wiring portion 55, the first detection wiring portion 56, and the second detection wiring portion 57. As described above, since the body wiring portion 51 has the constant potential, the body wiring portion 51 functions as a shield layer. Therefore, the electric force lines from the first driving wiring portion 52 and the second driving wiring portion 53 each terminate at the body wiring portion 51. Accordingly, it is possible to efficiently suppress the electrostatic capacitance coupling via the accommodation space S of at least one of the first driving wiring portion 52 and the second driving wiring portion 53 located one side of the body wiring portion 51 and at least one of the first monitor wiring portion 54, the second monitor wiring portion 55, the first detection wiring portion 56, and the second detection wiring portion 57 located on the other side of the body wiring portion 51. Here, the disposition of the body wiring portion 51 is not particularly limited.

In the embodiment, as illustrated in FIG. 7, the electrode portion 6 is electrically connected to the body wiring portion 51 via the conductive bump B. Thus, the electrode portion 6 can briefly have the reference potential. Here, the electrode portion 6 may not be electrically connected to the body wiring portion 51. In this case, for example, another wiring portion electrically connected to the electrode portion 6 may be installed and the electrode portion 6 may have a reference potential such as a fixed potential of about several volts such as a ground (GND) via this wiring portion.

In the embodiment, as illustrated in FIG. 7, the depression 23 includes a first depression 231 and a second depression 232 deeper than the first depression 231. The first depression 231 is disposed to overlap the first driving wiring portion 52 and the second driving wiring portion 53 in a plan view when viewed in the Z axis direction, and the second depression 232 is disposed to overlap the first monitor wiring portion 54, the second monitor wiring portion 55, the first detection wiring portion 56, and the second detection wiring portion 57.

In this way, by disposing the first driving wiring portion 52 and the second driving wiring portion 53 to overlap the first depression 231, it is possible to shorten a separation distance D1 between the first driving wiring portion 52 and the second driving wiring portion 53, and the electrode portion 6. Therefore, it is possible to more efficiently terminate the electric force lines from the first driving wiring portion 52 and the second driving wiring portion 53 by the electrode portion 6. On the other hand, by disposing the second depression 232 to overlap the first monitor wiring portion 54, the second monitor wiring portion 55, the first detection wiring portion 56, and the second detection wiring portion 57, it is possible to relatively enlarge a separation distance D2 between the first monitor wiring portion 54, the second monitor wiring portion 55, the first detection wiring portion 56, and the second detection wiring portion 57, and the electrode portion 6. Therefore, it is possible to suppress the electrostatic capacitance coupling between the first monitor wiring portion 54, the second monitor wiring portion 55, the first detection wiring portion 56, and the second detection wiring portion 57, and the electrode portion 6. Therefore, it is possible to further suppress an unwilling change in outputs from the first monitor wiring portion 54, the second monitor wiring portion 55, the first detection wiring portion 56, and the second detection wiring portion 57.

The separation distance D1 (the depth of the first depression 231) is not particularly limited and is preferably, for example, equal to or greater than 0.1 μm and equal to or less than 1 μm. Thus, it is possible to sufficiently approach the first driving wiring portion 52 and the second driving wiring portion 53 to the electrode portion 6 while suppressing a contact of the first driving wiring portion 52 and the second driving wiring portion 53 to the electrode portion 6. On the other hand, the separation distance D2 (the depth of the second depression 232) is not particularly limited and is preferably, for example, equal to or greater than 1 μm and equal to or less than 10 μm. Thus, it is possible to sufficiently separate the first monitor wiring portion 54, the second monitor wiring portion 55, the first detection wiring portion 56, and the second detection wiring portion 57 from the electrode portion 6 while suppressing a reduction in a mechanical strength of the base substrate 2 and an increase in the thickness of the base substrate 2 since the second depression 232 is further deepened.

The shape of the depression 23 is not particularly limited and, for example, the separation distances D1 and D2 may be the same as each other. That is, the depression 23 may be configured so that the depths of the portions are substantially the same as each other. In addition to the first depression 231 and the second depression 232, portions with different depths may be included.

The shape of the depression 23 has been described above. As illustrated in FIG. 8, the plurality of depressions 23 are disposed to be spaced from each other in the extension directions of the wiring portions 51, 52, 53, 54, 55, 56, and 57. In portions between the mutually adjacent depressions 23, that is, portions in which the depressions 23 do not overlap each other, the structure 5A of the wiring portions 51, 52, 53, 54, 55, 56, and 57 is fixed (bonded) to the upper surface of the base substrate 2. Thus, it is possible to fix the structure 5A to the base substrate 2.

Since the electrode portion 6 may not be disposed in a portion in which the structure 5A is fixed to the base substrate 2, the electrostatic capacitance coupling easily occurs between the first driving wiring portion 52 and the second driving wiring portion 53, and the first monitor wiring portion 54, the second monitor wiring portion 55, the first detection wiring portion 56, and the second detection wiring portion 57 via the base substrate 2. Accordingly, in the embodiment, as illustrated in FIG. 8, a fixed portion 541 of the first monitor wiring portion 54 to the base substrate 2, a fixed portion 551 of the second monitor wiring portion 55 to the base substrate 2, a fixed portion 561 of the first detection wiring portion 56 to the base substrate 2, and a fixed portion 571 of the second detection wiring portion 57 to the base substrate 2 are disposed to be shifted in the extension direction (the Y axis direction in FIG. 8) from a fixed portion 521 of the first driving wiring portion 52 to the base substrate 2 and a fixed portion 531 of the second driving wiring portion 53 to the base substrate 2. Thus, separation distances between the fixed portions 521 and 531, and the fixed portions 541, 551, 561, and 571 can be longer than when the fixed portions 521 and 531, and the fixed portions 541, 551, 561, and 571 are disposed in parallel to be adjacent to each other. Therefore, it is possible to efficiently suppress the electrostatic capacitance coupling between the first driving wiring portion 52 and the second driving wiring portion 53, and the first monitor wiring portion 54, the second monitor wiring portion 55, the first detection wiring portion 56, and the second detection wiring portion 57 via the base substrate 2.

In particular, in the embodiment, since the fixed portions 541, 551, 561, and 571 are disposed to be shifted one another in the extension direction, it is possible to efficiently suppress the electrostatic capacitance coupling between the first monitor wiring portion 54 and the second monitor wiring portion 55, and the first detection wiring portion 56 and the second detection wiring portion 57 via the base substrate 2.

The disposition of the fixed portions 511, 521, 531, 541, 551, 561, and 571 is not particularly limited. For example, the fixed portions 511, 521, 531, 541, 551, 561, and 571 may be disposed to be adjacent to each other.

in the embodiment, as illustrated in FIG. 7, the cover 3 includes a depression 34 opened on the bottom surface side of the depression 31. The depression 34 is disposed not to overlap the first driving wiring portion 52 and the second driving wiring portion 53 and to overlap the first monitor wiring portion 54, the second monitor wiring portion 55, the first detection wiring portion 56, and the second detection wiring portion 57 in a plan view when viewed in the Z axis direction. In this way, by disposing the depression 34 not to overlap the first driving wiring portion 52 and the second driving wiring portion 53, it is possible to shorten a separation distance D3 between the first driving wiring portion 52 and the second driving wiring portion 53, and the cover 3 (the bottom surface of the depression 31). Therefore, it is possible to more efficiently terminate the electric force lines from the first driving wiring portion 52 and the second driving wiring portion 53 by the cover 3. On the other hand, by disposing the depression 34 to overlap the first monitor wiring portion 54, the second monitor wiring portion 55, the first detection wiring portion 56, and the second detection wiring portion 57, it is possible to allow a separation distance D4 between the first monitor wiring portion 54, the second monitor wiring portion 55, the first detection wiring portion 56, and the second detection wiring portion 57 and the cover 3 (the bottom surface of the depression 34) to be relatively large. Therefore, it is possible to suppress the electrostatic capacitance coupling between the first monitor wiring portion 54, the second monitor wiring portion 55, the first detection wiring portion 56, and the second detection wiring portion 57, and the cover 3. Therefore, it is possible to further suppress an unwilling change in outputs from the first monitor wiring portion 54, the second monitor wiring portion 55, the first detection wiring portion 56, and the second detection wiring portion 57.

The separation distance D3 is not particularly limited and may be, for example, equal to or greater than 1 μm and equal to or less than 5 μm. Thus, it is possible to sufficiently approach the first driving wiring portion 52 and the second driving wiring portion 53 to the cover 3 while suppressing contact of the first driving wiring portion 52 and the second driving wiring portion 53 to the cover 3. On the other hand, the separation distance D4 is not particularly limited and may be, for example, equal to or greater than 5 μm and equal to or less than 20 μm. Thus, it is possible to sufficiently separate the first monitor wiring portion 54, the second monitor wiring portion 55, the first detection wiring portion 56, and the second detection wiring portion 57 from the cover 3 while suppressing a reduction in a mechanical strength of the cover 3 and an increase in the thickness of the cover 3 since the depression 34 is further deepened.

The configuration of the cover 3 is not particularly limited and the depression 34 may be omitted. That is, the separation distances D3 and D4 may be the same as each other. The cover 3 may include portions with different depths in addition to the depression 34.

The physical quantity sensor 1 has been described above. As described above, the physical quantity sensor 1 includes the base substrate 2, the first wiring portion 501 (the first driving wiring portion 52 and the second driving wiring portion 53) fixed to the base substrate 2, the second wiring portion 502 (the first monitor wiring portion 54, the second monitor wiring portion 55, the first detection wiring portion 56, and the second detection wiring portion 57) fixed to the base substrate 2 and at least partially installed in parallel to the first wiring portion 501, and the electrode portion 6 disposed in the base substrate 2 and having the reference potential. The electrode portion 6 is disposed between the base substrate 2, and the first wiring portion 501 and the second wiring portion 502. Thus, at least parts of the first wiring portion 501 and the second wiring portion 502 overlap the electrode portion 6 in the plan view. Thus, since the electric force lines from the first wiring portion 501 terminate at the electrode portion 6, it is possible to suppress the electrostatic capacitance coupling between the first wiring portion 501 and the second wiring portion 502 via the base substrate 2. Therefore, noise caused due to the electrostatic capacitance coupling rarely occurs in the second wiring portion 502, and thus an unwilling change in an output from the second wiring portion 502 is suppressed.

As described above, the physical quantity sensor 1 includes the driving portion 411 that can be displaced with respect to the base substrate 2, the fixed driving electrodes 441 and 442 that are fixed to the base substrate 2 and displace the driving portion 411 with respect to the base substrate 2, and the fixed monitor electrode 452 that is fixed to the base substrate 2 and detects the displacement of the driving portion 411. The first wiring portion 501 (the first driving wiring portion 52 and the second driving wiring portion 53) are electrically connected to the fixed driving electrodes 441 and 442 and the second wiring portion 502 (the first monitor wiring portion 54 and the second monitor wiring portion 55) are electrically connected to the fixed monitor electrode 452. Thus, noise caused due to the electrostatic capacitance coupling rarely occurs in the second wiring portion 502, and thus an unwilling change in an output from the second wiring portion 502 is suppressed. Accordingly, it is possible to detect the vibration state of the driving portion 411 with high precision based on the output from the second wiring portion 502 (the first monitor wiring portion 54 and the second monitor wiring portion 55).

As described above, the physical quantity sensor 1 includes the driving portion 411 that can be displaced with respect to the base substrate 2, the movable portion 461 that can be displaced with respect to the driving portion 411, the fixed driving electrodes 441 and 442 that are fixed to the base substrate 2 and displace the driving portion 411 with respect to the base substrate 2, and the fixed detection electrodes 481 and 482 that are fixed to the base substrate 2 and detects the displacement of the movable portion 461. The first wiring portion 501 (the first driving wiring portion 52 and the second driving wiring portion 53) are electrically connected to the fixed driving electrodes 441 and 442 and the second wiring portion 502 (the first detection wiring portion 56 and the second detection wiring portion 57) are electrically connected to the fixed detection electrodes 481 and 482. Thus, noise caused due to the electrostatic capacitance coupling rarely occurs in the second wiring portion 502, and thus an unwilling change in an output from the second wiring portion 502 is suppressed. Accordingly, it is possible to detect the displacement of the movable portion 461, that is, the angular velocity $\omega z$, with high precision based on the output from the second wiring portion 502 (the first detection wiring portion 56 and the second detection wiring portion 57).

As described above, the physical quantity sensor 1 includes the third wiring portion 503 (the body wiring portion 51) that is fixed to the base substrate 2 and is electrically connected to the driving portion 411. Then, the third wiring portion 503 is located between the first wiring portion 501 and the second wiring portion 502 and has a constant potential. Therefore, the third wiring portion 503 functions as a shield layer and the electric force line from the first wiring portion 501 terminates at the third wiring portion 503. Accordingly, it is possible to efficiently suppress the electrostatic capacitance coupling between the first wiring portion 501 located on one side of the third wiring portion 503 and the second wiring portion 502 located on the other side of the third wiring portion 503.

As described above, the physical quantity sensor 1 includes the driving portion 411 that can be displaced with respect to the base substrate 2, the movable portion 461 that can be displaced with respect to the driving portion 411, the fixed driving electrodes 441 and 442 that are fixed to the base substrate 2 and displace the driving portion 411 with respect to the base substrate 2, the fixed monitor electrode 452 that is fixed to the base substrate 2 and detects the displacement of the driving portion, the fixed detection electrodes 481 and 482 that are fixed to the base substrate 2 and detects the displacement of the movable portion 461, and third wiring portion 503 that is fixed to the base substrate 2 and is electrically connected to the driving portion 411. The third wiring portion 503 (the body wiring portion 51) is located between the first wiring portion 501 and the second wiring portion 502 and is connected to the constant potential. The first wiring portion 501 (the first driving wiring portion 52 and the second driving wiring portion 53) is electrically connected to the fixed driving electrodes 441 and 442. The second wiring portion 502 includes the first monitor wiring portion 54 and the second monitor wiring portion 55 (the monitor wiring portion) electrically connected to the fixed monitor electrode 452 and the first detection wiring portion 56 and the second detection wiring portion 57 (the detection wiring portion) electrically connected to the fixed detection electrodes 481 and 482. The first monitor wiring portion 54 and second monitor wiring portion 55 are located between the body wiring portion 51, and the first detection wiring portion 56 and the second detection wiring portion 57. Thus, it is possible to further separate the first detection wiring portion 56 and the second detection wiring portion 57 from the first driving wiring portion 52 and the second driving wiring portion 53, and thus it is possible to more efficiently suppress the electrostatic capacitance coupling between the first driving wiring portion 52 and the second driving wiring portion 53, and the first detection wiring portion 56 and the second detection wiring portion 57 via the base substrate 2. Therefore, it is possible to detect the displacement of the movable portion 461, that is, the angular velocity ωz, with high precision based on the outputs from the first detection wiring portion 56 and the second detection wiring portion 57.

In the physical quantity sensor 1, as described above, the electrode portion 6 is electrically connected to the third wiring portion 503. Thus, the electrode portion 6 can be set to have the reference potential with a relatively simple configuration.

In the physical quantity sensor 1, as described above, the base substrate 2 includes the depression 23 disposed to overlap the first wiring portion 501 and the second wiring portion 502 in the plan view, and the electrode portion 6 is disposed in the depression 23. Thus, it is possible to dispose the electrode portion 6 while preventing contact with the first wiring portion 501 and the second wiring portion 502 with a relatively simple configuration.

In the physical quantity sensor 1, as described above, the separation distance D1 between the depression 23 and the first wiring portion 501 is less than the separation distance D2 between the depression 23 and the second wiring portion 502. Thus, it is possible to more efficiently terminate the electric force line from the first wiring portion 501 at the electrode portion 6. It is possible to suppress the electrostatic capacitance coupling between the second wiring portion 502 and the electrode portion 6. Therefore, the unwilling change in the output from the second wiring portion is further suppressed.

In the physical quantity sensor 1, as described above, each of the first wiring portion 501 and the second wiring portion 502 is located in a portion which does not overlap the depression 23 in the plan view and includes the fixed portions fixed to the base substrate 2. The fixed portions (the fixed portions 521 and 531) of the first wiring portion 501 and the fixed portions (the fixed portions 541, 551, 561, and 571) of the second wiring portion 502 are disposed to be shifted in the extension direction of the first wiring portion 501 and the second wiring portion 502. Thus, it is possible to lengthen the separation distances between the fixed portions 521 and 531 and the fixed portions 541, 551, 561, and 571. Therefore, it is possible to efficiently suppress the electrostatic capacitance coupling between the first wiring portion 501 and the second wiring portion 502 via the base substrate 2.

As described above, the physical quantity sensor 1 includes the cover 3 which has the constant potential and is disposed with the first wiring portion 501 and the second wiring portion 502 interposed with the base substrate 2. The separation distance D3 between the cover 3 and the first wiring portion 501 is less than the separation distance D4 between the cover 3 and the second wiring portion 502. Thus, it is possible to more efficiently terminate the electric force line from the first wiring portion 501 at the cover 3. It is possible to suppress the electrostatic capacitance coupling between the second wiring portion 502 and the cover 3. Therefore, the unwilling change in the output from the second wiring portion 502 is further suppressed.

The first embodiment has been described above. In the embodiment, the body wiring portion 51, the first driving wiring portion 52, the second driving wiring portion 53, the first monitor wiring portion 54, the second monitor wiring portion 55, the first detection wiring portion 56, and the second detection wiring portion 57 are disposed in the region T, but the invention is not limited thereto. For example, the first monitor wiring portion 54 and the second monitor wiring portion 55 may not be disposed or the first detection wiring portion 56 and the second detection wiring portion 57 may not be disposed.

In the embodiment, the configuration in which the electrode portion 6 is disposed in the depression 23 of the base substrate 2 has been described. However, the invention is not particularly limited as long as the electrode portion 6 can be disposed between the base substrate 2, and the first wiring portion 501 and the second wiring portion 502. For example, instead of omitting the depression 23, as illustrated in FIG. 9, depressions opened to the lower surface side may be formed in the first wiring portion 501 and the second wiring portion 502 and the electrode portion 6 may be disposed to overlap the depressions.

In the embodiment, the configuration of the gyro sensor in which the physical quantity sensor 1 detects an angular velocity around the Z axis has been described, but the physical quantity sensor 1 is not particularly limited. For example, a gyro sensor detecting an angular velocity around the X axis may be used or a gyro sensor detecting an angular velocity around the Y axis may be used. A physical quantity detected by the physical quantity sensor 1 is not limited to the angular velocity and may be, for example, acceleration or a pressure.

Second Embodiment

Next, a physical quantity sensor device according to a second embodiment of the invention will be described.

Figure 10:
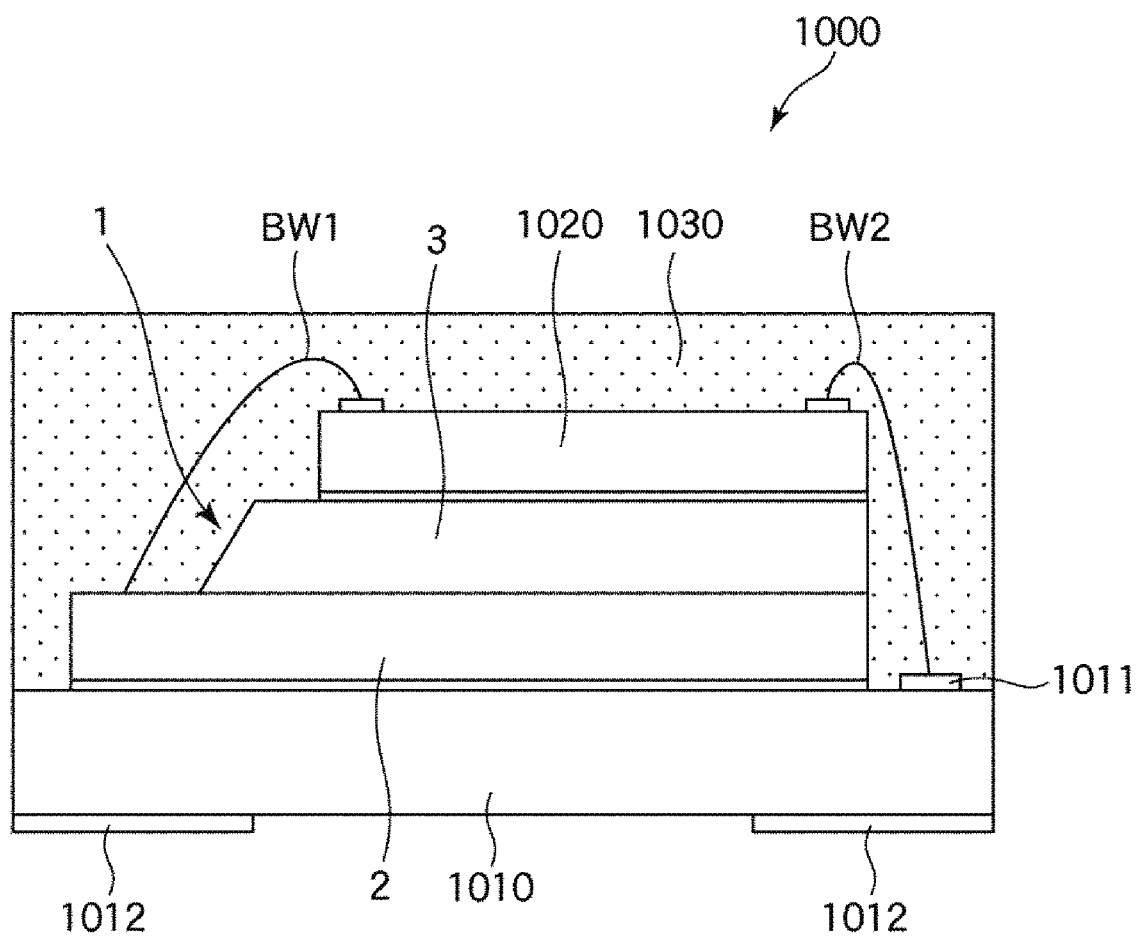
FIG. 10 is a sectional view illustrating a physical quantity sensor device according to a second embodiment of the invention.

FIG. 10 is a sectional view illustrating the physical quantity sensor device according to the second embodiment of the invention.

As illustrated in FIG. 10, a physical quantity sensor device 1000 includes a base substrate 1010, a physical quantity sensor 1 installed on the base substrate 1010, a circuit element 1020 (IC) installed on the physical quantity sensor 1, a bonding wire BW1 electrically connecting the physical quantity sensor 1 to the circuit element 1020, a bonding wire BW2 electrically connecting the base substrate 1010 to the circuit element 1020, and a mold unit 1030 molding the physical quantity sensor 1 and the circuit element 1020.

The base substrate 1010 is a substrate that supports the physical quantity sensor 1 and is, for example, an interposer substrate. A plurality of connection terminals 1011 are disposed on the upper surface of the base substrate 1010 and a plurality of mount terminals 1012 are disposed on the lower surface of the base substrate 1010. Inside the base substrate 1010, internal wirings (not illustrated) are disposed and the connection terminals 1011 are electrically connected to the corresponding mount terminals 1012 via the internal wirings. The base substrate 1010 is not particularly limited and, for example, a silicon substrate, a ceramic substrate, a resin substrate, a glass substrate, or a glass epoxy substrate can be used.

The physical quantity sensor 1 is disposed on the base substrate 1010 so that the base substrate 2 is oriented on the lower side (the side of the base substrate 1010). The physical quantity sensor 1 is bonded to the base substrate 1010 via a bonding member.

The circuit element 1020 is disposed on the physical quantity sensor 1. The circuit element 1020 is bonded to the cover 3 of the physical quantity sensor 1 via the bonding member. The circuit element 1020 is electrically connected to each electrode pad of the physical quantity sensor 1 via the bonding wire BW1 and is electrically connected to the connection terminals 1011 of the base substrate 1010 via the bonding wire BW2. The circuit element 1020 includes a driving circuit that drives the physical quantity sensor 1, a detection circuit that detects an angular velocity based on an output signal from the physical quantity sensor 1, or an output circuit that converts a signal from the detection circuit into a predetermined signal and outputs the predetermined signal, as necessary.

The mold unit 1030 molds the physical quantity sensor 1 and the circuit element 1020. Thus, it is possible to protect the physical quantity sensor 1 or the circuit element 1020 from moisture, dust, shock, or the like. The mold unit 1030 is not particularly limited. For example, a heat-curable epoxy resin can be used. For example, molding can be performed in accordance with a transfer molding method.

The above-described physical quantity sensor device 1000 includes the physical quantity sensor 1. Therefore, it is possible to obtain the advantages of the physical quantity sensor 1 and it is possible to obtain the physical quantity sensor device 1000 with high reliability.

The configuration of the physical quantity sensor device 1000 is not limited to the foregoing configuration. For example, the physical quantity sensor 1 may be configured to be accommodated in a ceramic package.

Third Embodiment

Next, an electronic apparatus according to a third embodiment of the invention will be described.

Figure 11:
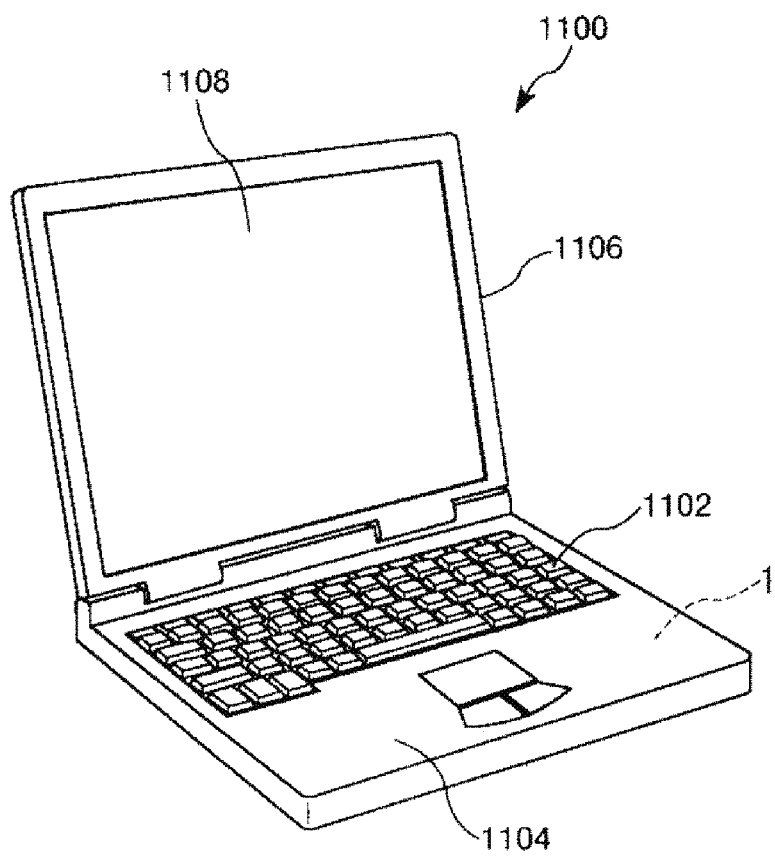
FIG. 11 is a perspective view illustrating an electronic apparatus according to a third embodiment of the invention.

FIG. 11 is a perspective view illustrating the electronic apparatus according to the third embodiment of the invention.

A mobile (or notebook-type) personal computer 1100 illustrated in FIG. 11 is applied as an electronic apparatus that includes the physical quantity sensor according to the invention. In the drawing, the personal computer 1100 includes a body unit 1104 including a keyboard 1102 and a display unit 1106 including a display portion 1108. The display unit 1106 is supported to be rotatable via a hinge structure unit with respect to the body unit 1104. The personal computer 1100 contains the physical quantity sensor 1 that functions as an angular velocity sensor.

The personal computer 1100 (an electronic apparatus) includes the physical quantity sensor 1. Therefore, it is possible to obtain the advantages of the above-described physical quantity sensor 1, and thus it is possible to achieve high reliability.

Fourth Embodiment

Next, an electronic apparatus according to a fourth embodiment of the invention will be described.

Figure 12:
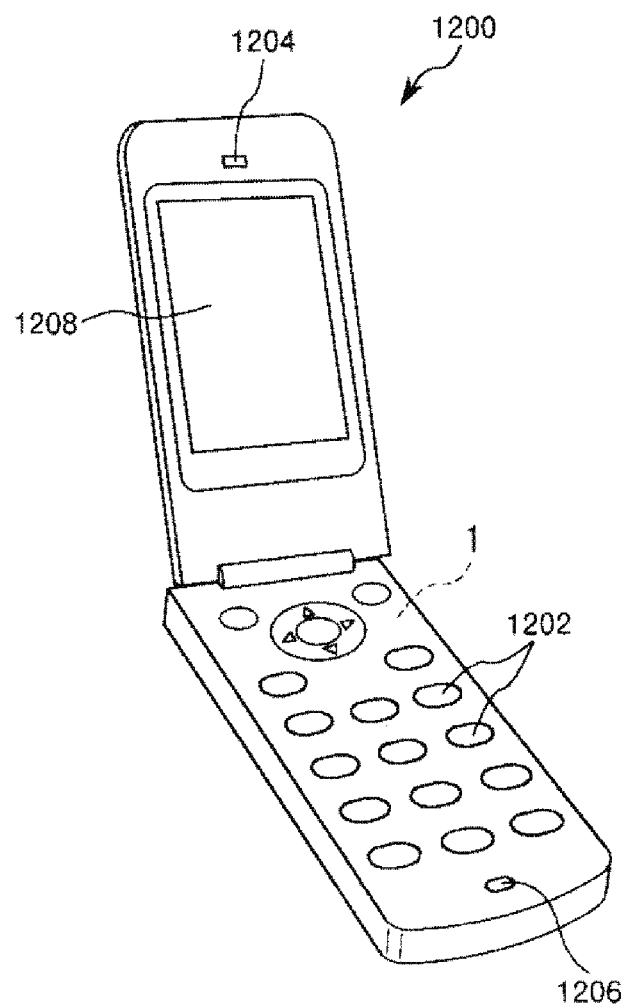
FIG. 12 is a perspective view illustrating an electronic apparatus according to a fourth embodiment of the invention.

FIG. 12 is a perspective view illustrating the electronic apparatus according to the fourth embodiment of the invention.

A mobile phone 1200 (also including a PHS) illustrated in FIG. 12 is applied as an electronic apparatus that includes the physical quantity sensor according to the invention. In the drawing, the mobile phone 1200 includes an antenna (not illustrated), a plurality of operation buttons 1202, an earpiece 1204, and a mouth piece 1206. A display unit 1208 is disposed between the operation buttons 1202 and the earpiece 1204. The mobile phone 1200 contains the physical quantity sensor 1 that functions as an acceleration sensor.

The mobile phone 1200 (an electronic apparatus) includes the physical quantity sensor 1. Therefore, it is possible to obtain the advantages of the above-described physical quantity sensor 1, and thus it is possible to achieve high reliability.

Fifth Embodiment

Next, an electronic apparatus according to a fifth embodiment of the invention will be described.

Figure 13:
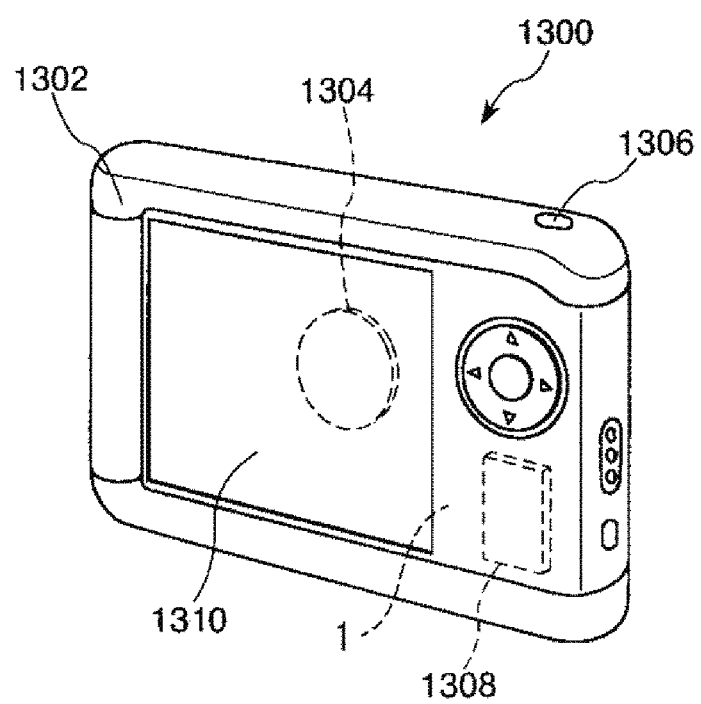
FIG. 13 is a perspective view illustrating an electronic apparatus according to a fifth embodiment of the invention.

FIG. 13 is a perspective view illustrating the electronic apparatus according to the fifth embodiment of the invention.

A digital still camera 1300 illustrated in FIG. 13 is applied as an electronic apparatus that includes the physical quantity sensor according to the invention. In the drawing, a display unit 1310 is installed on the rear surface of a case (body) 1302 and is configured to perform display based on an imaging signal by a CCD. The display unit 1310 functions as a finder that displays a subject as an electronic image. A light-receiving unit 1304 including an optical lens (an imaging optical system) or a CCD is installed on the front surface side (the rear surface side in the drawing) of the case 1302. When a photographer confirms a subject image displayed on the display unit 1310 and presses a shutter button 1306, an imaging signal of the CCD at that time point is transferred and stored in the memory 1308. The digital still camera 1300 contains the physical quantity sensor 1 that functions as an acceleration sensor.

The digital still camera 1300 (an electronic apparatus) includes the physical quantity sensor 1. Therefore, it is possible to obtain the advantages of the above-described physical quantity sensor 1, and thus it is possible to achieve high reliability.

The electronic apparatus according to the invention can be applied not only to the personal computer, the mobile phone, and the digital still camera according to the above-described embodiments, but also to, for example, a smartphone, a tablet terminal, a timepiece (including a smart timepiece), an ink jet ejection apparatus (for example, an ink jet printer), a laptop personal computer, a television, a wearable terminal such as a head-mounted display (HMD), a video camera, a video tape recorder, a car navigation apparatus, a pager, an electronic organizer (also including a communication function unit), an electronic dictionary, a calculator, an electronic game apparatus, a word processor, a workstation, a television telephone, a security television monitor, electronic binoculars, a POS terminal, a medical apparatus (for example, an electronic thermometer, a blood-pressure meter, a blood-sugar meter, an electrocardiographic apparatus, an ultrasonic diagnostic apparatus, or an electronic endoscopy), a fish finder, various measurement apparatuses, a mobile terminal base station apparatus, meters (for example, meters for cars, airplanes, and ships), a flight simulator, and a network server.

Sixth Embodiment

Next, a vehicle according to a sixth embodiment of the invention will be described.

Figure 14:
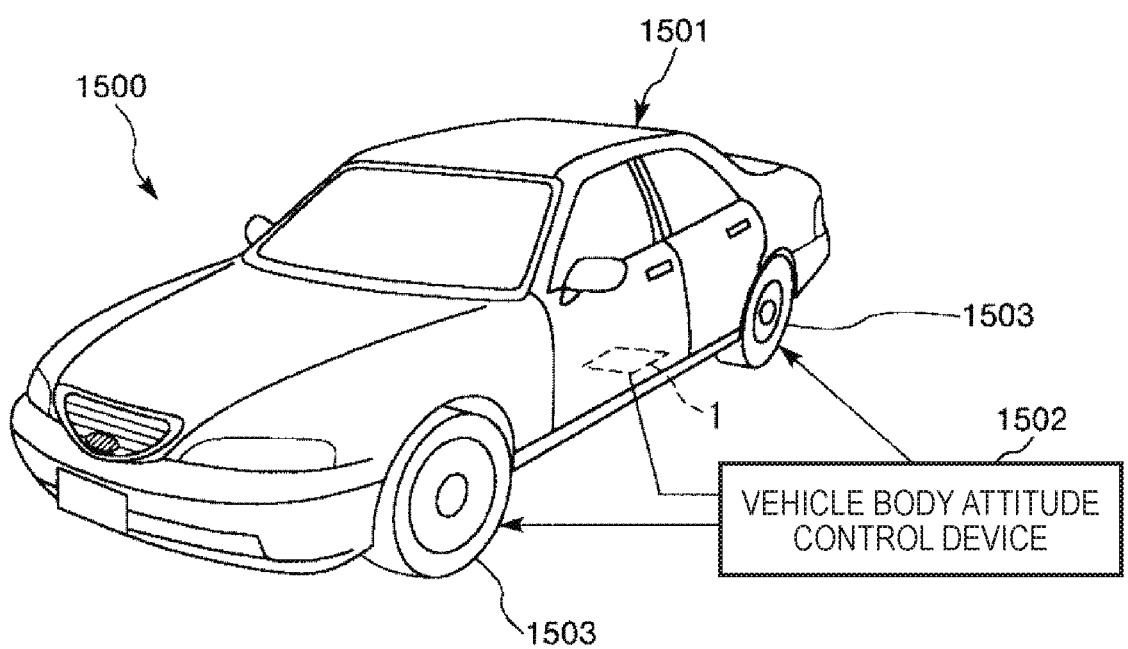
FIG. 14 is a perspective view illustrating a vehicle according to a sixth embodiment of the invention.

FIG. 14 is a perspective view illustrating the vehicle according to the sixth embodiment of the invention.

An automobile 1500 illustrated in FIG. 14 is an automobile to which a vehicle including the physical quantity sensor according to the invention is applied. In the drawing, the automobile 1500 contains the physical quantity sensor 1 that functions as an angular velocity sensor. Thus, the physical quantity sensor 1 can detect an attitude of a vehicle body 1501. A detection signal of the physical quantity sensor 1 is supplied to a vehicle body attitude control device 1502. Then, the vehicle body attitude control device 1502 detects an attitude of the vehicle body 1501 based on the detection signal and can control hardness or softness of a suspension in accordance with a detection result or controls a brake of an individual wheel 1503.

The automobile 1500 (a vehicle) includes the physical quantity sensor 1. Therefore, it is possible to obtain the advantages of the above-described physical quantity sensor 1, and thus it is possible to achieve high reliability.

The physical quantity sensor 1 can also be broadly applied to a car navigation system, a car air conditioner, an antilock brake system (ABS), an air bag, a tire pressure monitoring system (TPMS), an engine control, and an electronic control unit (ECU) such as a battery monitor of a hybrid automobile or an electric automobile.

The vehicle is not limited to the automobile 1500, but can also be applied to, for example, an airplane, a rocket, an artificial satellite, a ship, an AGV (an unmanned carrier), a bipedal walking robot, and an unmanned aircraft such as a drone.

The physical quantity sensor, the physical quantity sensor device, the electronic apparatus, and the vehicle according to the invention have been described according to the illustrated embodiments, but the invention is not limited thereto. The configuration of each unit can be substituted with any configuration with the same function. Any other constituent may be added to the invention.

The entire disclosure of Japanese Patent Application No. 2017-063723, filed on Mar. 28, 2017 is expressly incorporated by reference herein.

What is claimed is:

1. A physical quantity sensor comprising:
an insulating base substrate;
a fixed driving electrode disposed on the base substrate;
a fixed detection electrode disposed on the base substrate;
a driving member having a movable driving electrode therein at a first position, the driving member being movable relative to the base substrate, the driving member being spaced apart from the base substrate, the movable driving electrode facing the fixed driving electrode in a thickness direction of the base substrate;
a movable member having a movable detection electrode therein at a second position, the movable member being movable relative to the driving member, the movable detection electrode facing the fixed detection electrode in the thickness direction of the base substrate, the fixed detection electrode and the movable detection electrode being configured to detect displacement of the movable member;
a first wiring that is fixed to the base substrate at an edge portion of the base substrate, the first wiring being electrically connected to the fixed driving electrode;
a second wiring that is fixed to the base substrate at the edge portion of the base substrate, the second wiring being electrically connected to the fixed detection electrode, the second wiring being partially arranged in parallel to the first wiring; and
a reference electrode disposed on the base substrate and having a reference potential,
wherein the reference electrode is sandwiched between the base substrate and the first and second wirings along the thickness direction, and
wherein the first and second wirings partially overlap the reference electrode in the thickness direction.

2. The physical quantity sensor according to claim 1, further comprising:
a third wiring that is fixed to the base substrate, the third wiring being electrically connected to the driving member,
wherein the third wiring has a constant potential and is located between the first and second wirings on the base substrate.

3. The physical quantity sensor according to claim 2,
wherein the reference electrode is electrically connected to the third wiring.

4. A physical quantity sensor comprising:
an insulating base substrate;
a fixed driving electrode disposed on the base substrate;
a fixed monitor electrode disposed on the base substrate;
a driving member having a movable driving electrode and a movable monitor electrode therein at first and second positions, respectively, the driving member being movable relative to the base substrate, the driving member being spaced apart from the base substrate, the movable driving electrode facing the fixed driving electrode in a thickness direction of the base substrate, the movable monitor electrode facing the fixed monitor electrode in the thickness direction, the fixed monitor electrode and the movable monitor electrode being configured to detect displacement of the driving member;
a first wiring that is fixed to the base substrate at an edge portion of the base substrate, the first wiring being electrically connected to the fixed driving electrode;
a second wiring that is fixed to the base substrate at the edge portion of the base substrate, the second wiring being electrically connected to the fixed monitor electrode, the second wiring being partially arranged in parallel to the first wiring; and
a reference electrode disposed on the base substrate and having a reference potential,
wherein the reference electrode is sandwiched between the base substrate and the first and second wirings along the thickness direction, and
wherein the first and second wirings partially overlap the reference electrode in the thickness direction.

5. A physical quantity sensor comprising:
an insulating base substrate;
a fixed driving electrode disposed on the base substrate;

a fixed detection electrode disposed on the base substrate;
a fixed monitor electrode disposed on the base substrate;
a driving member having a movable driving electrode and a movable monitor electrode therein at first and second positions, respectively, the driving member being movable relative to the base substrate, the driving member being spaced apart from the base substrate, the movable driving electrode facing the fixed driving electrode in a thickness direction of the base substrate, the movable monitor electrode facing the fixed monitor electrode in the thickness direction, the fixed monitor electrode and the movable monitor electrode being configured to detect displacement of the driving member;
a movable member having a movable detection electrode therein at a third position, the movable member being movable relative to the driving member, the movable detection electrode facing the fixed detection electrode in the thickness direction, the fixed detection electrode and the movable detection electrode being configured to detect displacement of the movable member;
a first wiring that is fixed to the base substrate at an edge portion of the base substrate, the first wiring being electrically connected to the fixed driving electrode;
a second wiring that is fixed to the base substrate at the edge portion of the base substrate, the second wiring having a monitor wiring portion and a detection wiring portion, the monitor wiring portion being electrically connected to the fixed monitor electrode, the detection wiring portion being electrically connected to the fixed detection electrode, the second wiring being partially arranged in parallel to the first wiring;
a third wiring that is fixed to the base substrate, the third wiring being electrically connected to the driving member; and
a reference electrode disposed on the base substrate and having a reference potential,
wherein the reference electrode is sandwiched between the base substrate and the first and second wirings along the thickness direction,
the first and second wirings partially overlap the reference electrode in the thickness direction,
wherein the third wiring has a constant potential and is located between the first and second wirings on the base substrate, and
wherein the monitor wiring portion is located between the third wiring and the detection wiring portion on the base substrate.

6. The physical quantity sensor according to claim 5, wherein the reference electrode is electrically connected to the third wiring.

* * * * *